(12) United States Patent
Smoak et al.

(10) Patent No.: US 9,880,700 B2
(45) Date of Patent: *Jan. 30, 2018

(54) HOME SCREEN USER INTERFACE FOR ELECTRONIC DEVICE DISPLAY

(71) Applicant: AT&T Mobility II LLC, Atlanta, GA (US)

(72) Inventors: Andrew Thomas Smoak, Marietta, GA (US); Michelle Mindala-Freeman, Atlanta, GA (US); David Ames Christopher, Atlanta, GA (US)

(73) Assignee: AT&T MOBILITY II, LLC, Atlanta, GA (US)

( * ) Notice: Subject to any disclaimer, the term of this patent is extended or adjusted under 35 U.S.C. 154(b) by 570 days.

This patent is subject to a terminal disclaimer.

(21) Appl. No.: 14/465,469

(22) Filed: Aug. 21, 2014

(65) Prior Publication Data

US 2014/0365908 A1 Dec. 11, 2014

Related U.S. Application Data

(63) Continuation of application No. 11/775,068, filed on Jul. 9, 2007, now Pat. No. 8,843,853.

(Continued)

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 3/04842* (2013.01);
(Continued)

(58) Field of Classification Search
CPC ..... G06F 17/214; G06F 2209/549; G06F 9/46
See application file for complete search history.

(56) References Cited

U.S. PATENT DOCUMENTS 5,999,228 A * 12/1999 Matsuura ............. H04N 21/485
345/419
6,263,217 B1 7/2001 Park
(Continued)

OTHER PUBLICATIONS

Oliveira et al., Active Customization of GIS user Interface; © 1997; IEEE; 10 pages.*

(Continued)

*Primary Examiner* — Linh K Pham
(74) *Attorney, Agent, or Firm* — Amin, Turocy & Watson, LLP

(57) ABSTRACT

A user interface overlay is presented over a native graphical user interface (GUI) of a device. By way of example, the overlay can include a graphical presentation layer (GPL) that can selectively mask and/or expose functionality of the native GUI of the device. In addition, the GPL can bundle disparate portions of native functionality in accord with one or more logical associations between a title, tag, application, purpose, type, or like qualifier, associated with the disparate portions. In addition, user preferences and device/network intelligence components can dynamically customize portions of the GPL to match a location, locale, mood, or setting or like situational context of a device and/or user.

20 Claims, 14 Drawing Sheets

Related U.S. Application Data

(60) Provisional application No. 60/868,617, filed on Dec. 5, 2006.

(51) Int. Cl.
    *G06F 3/0482* (2013.01)
    *G06F 17/30* (2006.01)
    *H04L 29/08* (2006.01)
    *G06F 9/44* (2006.01)
    *H04M 1/725* (2006.01)
    *G06F 3/0484* (2013.01)

(52) U.S. Cl.
    CPC ........ *G06F 9/4443* (2013.01); *G06F 17/3087* (2013.01); *H04L 67/18* (2013.01); *H04M 1/72563* (2013.01); *H04M 1/72583* (2013.01)

(56) References Cited

U.S. PATENT DOCUMENTS

| | | |
|---|---|---|
| 6,915,486 B2 | 7/2005 | Li et al. |
| 7,532,894 B1 | 5/2009 | Muhonen et al. |
| 7,536,645 B2 | 5/2009 | Ducharme et al. |
| 7,587,683 B2* | 9/2009 | Ito ..................... G06F 3/04817 455/566 |
| 8,045,964 B2 | 10/2011 | Onishi et al. |
| 8,060,582 B2 | 11/2011 | Bliss et al. |
| 8,204,966 B1 | 6/2012 | Mendis et al. |
| 8,280,414 B1 | 10/2012 | Nourse et al. |
| 8,589,407 B2 | 11/2013 | Bhatia |
| 8,682,712 B2 | 3/2014 | Khopkar et al. |
| 8,707,201 B1 | 4/2014 | Aradhye et al. |
| 8,751,500 B2 | 6/2014 | Duarte et al. |
| 8,909,631 B1 | 10/2014 | Bellver et al. |
| 8,855,684 B2 | 12/2014 | Seth et al. |
| 2002/0122061 A1* | 9/2002 | Martin, Jr. ............ G06F 9/4443 715/762 |
| 2003/0026231 A1 | 2/2003 | Lazaridis et al. |
| 2003/0063120 A1* | 4/2003 | Wong .................. G06F 9/4443 715/746 |
| 2003/0117432 A1* | 6/2003 | Kautto-Kiovula .... G06F 3/0481 715/735 |
| 2004/0201603 A1 | 10/2004 | Kalish |
| 2005/0208892 A1 | 9/2005 | Kotola et al. |
| 2005/0235209 A1* | 10/2005 | Morita ................. G06F 3/0482 715/716 |
| 2006/0084477 A1 | 4/2006 | Wardimon et al. |
| 2006/0089792 A1 | 4/2006 | Manber et al. |
| 2006/0143574 A1 | 6/2006 | Ito et al. |
| 2006/0235755 A1* | 10/2006 | Mueller ............... G06Q 20/201 705/15 |
| 2007/0044086 A1 | 2/2007 | Sampath et al. |
| 2007/0069946 A1* | 3/2007 | Kaplan ................. G06Q 30/02 342/357.64 |
| 2007/0281689 A1 | 12/2007 | Altman et al. |
| 2008/0028326 A1* | 1/2008 | Wilson ................. G06F 9/4443 715/762 |
| 2008/0070593 A1 | 3/2008 | Altman et al. |
| 2008/0172372 A1 | 7/2008 | Shacham et al. |
| 2008/0215999 A1 | 9/2008 | Kim et al. |
| 2009/0249247 A1 | 10/2009 | Tseng et al. |
| 2010/0138553 A1 | 6/2010 | Yuan et al. |
| 2011/0107208 A1 | 5/2011 | Michaelraj et al. |
| 2011/0179377 A1* | 7/2011 | Fleming ................. G06F 9/541 715/779 |
| 2012/0174021 A1 | 7/2012 | Dharawat et al. |
| 2013/0152129 A1 | 6/2013 | Alberth et al. |
| 2013/0346882 A1 | 12/2013 | Shiplacoff et al. |
| 2014/0057659 A1 | 2/2014 | Udeshi et al. |
| 2014/0075369 A1 | 3/2014 | Joshi et al. |
| 2014/0129544 A1 | 5/2014 | Haugen et al. |
| 2014/0280131 A1 | 9/2014 | Martens et al. |
| 2014/0317099 A1 | 10/2014 | Jain et al. |

OTHER PUBLICATIONS

Yates et al., Searching the Web Using a Map; © 2000; IEEE; 8 pages.*

Office Action dated May 12, 2010 for U.S. Appl. No. 11/775,068, 23 pages.

Office Action dated Oct. 29, 2010 for U.S. Appl. No. 11/775,068, 27 pages.

Office Action dated Dec. 12, 2011 for U.S. Appl. No. 11/775,068, 33 pages.

Office Action dated Jun. 20, 2012 for U.S. Appl. No. 11/775,068, 33 pages.

Notice of Allowance dated May 22, 2014 for U.S. Appl. No. 11/775,068, 46 pages.

Oliveira, et al., "Active Customization of GIS User Interface", © 1997; IEEE; retrieved on May 22, 2014, 10 pages.

Virrantaus, et al., "Developing GIS-supported Location-Based Services", © 2002; IEEE; retrieved on May 22, 2014, 10 pages.

Chittaro, Luca. "Visualizing Information on Mobile Devices" 2006, IEEE Computer Society, 6 pages.

Pokraev et al. "Service Platform for Rapid Development and Deployment of Context-Aware, Mobile Applications", Nov. 14, 2005, IEEE International Conference on Web Services, 8 pages.

Notice of Allowance dated May 4, 2017 for U.S. Appl. No. 14/717,486, 59 pages.

* cited by examiner

HOME SCREEN USER INTERFACE FOR ELECTRONIC DEVICE DISPLAY

CROSS-REFERENCE TO RELATED APPLICATION

This application is a continuation of, and claims the benefit of priority to each of, U.S. patent application Ser. No. 11/775,068 entitled "HOME SCREEN USER INTERFACE FOR ELECTRONIC DEVICE DISPLAY," filed Jul. 9, 2007, which claims the benefit of priority to U.S. Provisional Patent application Ser. No. 60/868,617 entitled "HOME SCREEN UI" which was filed Dec. 5, 2006. The entireties of the aforementioned applications are herein incorporated by reference.

BACKGROUND

As cellular telephones become more technically advanced, they invariably incorporate more features and applications that increase communication capabilities of a cellular telephone user. New features and applications generally increase in number and complexity commensurate with technical advancements that enable such features. One of the most significant technical advancements in cellular telephone technology has been the transition from a voice-only communication platform to a voice and data communication platform. The transition from a voice-only platform to a voice and data platform in mobile communication technology has introduced a very rich set of features and applications to cellular telephones that were traditionally available only with a computer or similar device. Now, however, with the ability to transmit data over broadband mobile communication networks, telephone subscribers expect the capabilities traditionally available from personal computers to also be available on cellular telephones.

Because a cellular telephone is a much more mobile (and consequently smaller) device than most computers, several challenges are introduced when features traditionally implemented on a personal computer are available on a cellular phone. One challenge is to display advanced features on a small display screen. The relatively small display area of mobile communication devices can make displaying and accessing the features a challenge.

The average cellular device user desires fast and intuitive access to common features available on a device, and at the same time does not want to be overwhelmed by a complex graphical user interface (GUI). It can be difficult to implement a user interface that provides direct access to a device's features in a straightforward and intuitive manner. Cellular phone and cellular phone service providers are often required to 'bury' features on lower logical layers to avoid overwhelming users with the quantity of graphical icons presented on a mobile-sized display. Consequently, many features that might distinguish one provider's service or device from another's are unnoticed by many users. Even worse, a provider's device or service may overwhelm a large segment of users and be undesirable to them.

To further complicate typical problems, marketing studies have shown that many users expect to interact with features and applications on mobile devices in a manner comparable to their own experience on a personal computer, despite the smaller display size of a mobile communication device, and despite the fact that experiences with computing devices differ widely. Many solutions have been presented to solve this problem, but the complexity of the problem can outpace available solutions during periods of rapid technological improvement.

DETAILED DESCRIPTION

Figure 1:
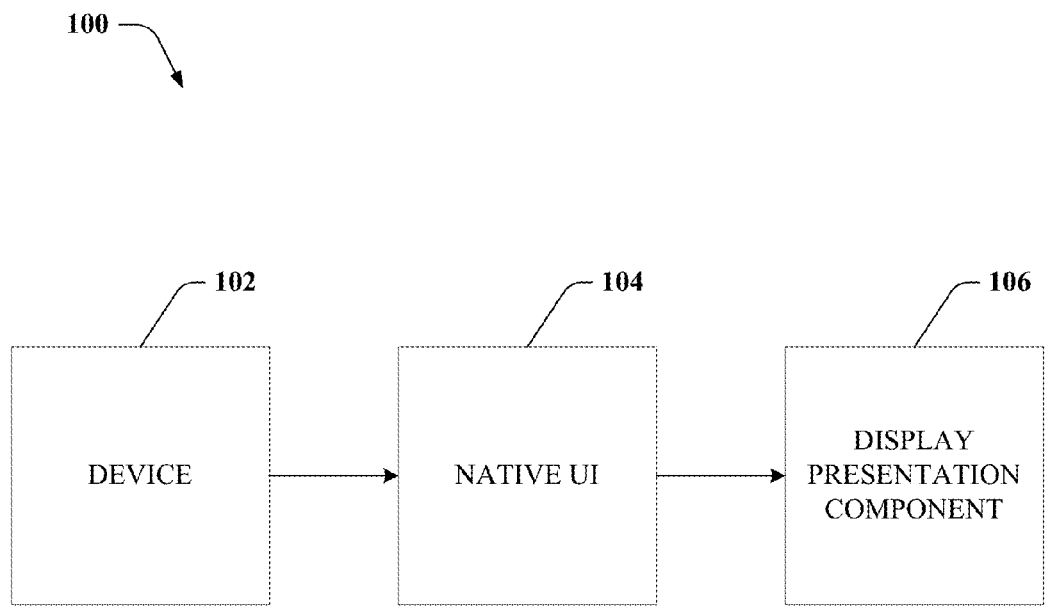
FIG. 1 is an example high-level block diagram of a system that selectively masks and exposes native functions and applications of a mobile communication device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The subject matter of the disclosure relates to overlaying a native graphical user interface (GUI) of a device with a graphical presentation layer (GPL) that can selectively mask and/or expose functionality of the native GUI of the device. A GPL can interact with the native GUI in multiple ways. For example, a GPL can act as a graphical skin that suppresses the native GUI, such that the device user can access features and applications of the device only by way of the GPL. Alternately, or in addition, a GPL can mask the native GUI such that all or a subset of all of the device functionality is presented to a user in a manner different from the GUI. If a user executes a native function through the GPL interface, the GPL can interact with the native GUI to execute, unmask, and/or display a particular function or application alongside the GPL interface. Once executed, a user can then interact with the function as if executed through the native GUI.

In accordance with additional aspects of the subject disclosure, all or a portion of all of the features of a device can be displayed according to a user specified and/or artificial intelligence (AI) generated profile. A user can specify, for example, contemporaneous interests at various times of day, on particular days, in particular locations, locals or the like, and a GPL can mask features of the device not in accord with such interest and expose features that are in accord with the user specified interest. Alternatively, or in addition, components of the GPL and/or device can determine objective data associated with a device, for example time of day, location, temperature, weather, surrounding locale, etc., in conjunction with selectively masking, exposing, and/or customizing native user interface functionality in a manner appropriate for a particular user or a typical user.

In accord with additional aspects of the subject innovation, custom function groups bearing a logical relation to a subset of native functionality can be created to organize such functionality. In addition, such function groups can be related to a user specified preference or interest. For example, a user created profile can indicate that a user prefers business related information in the morning and afternoon, and entertainment related information in the evening. A GPL can create appropriate function groups at appropriate times of day, each exposing applications, features, functions, artwork, ringtones, etc., logically related to the custom function group. An AI component can track a user's device history and further modify a custom function group and/or exposed functionality according to objective data associated with a device and a user's previous application history use. Accordingly, aspects of the claimed subject matter provide for dynamically customizing a user interface of a device in accord with a situational context of a user.

Referring initially to the drawings, FIG. 1 illustrates an example system 100 that can selectively mask and expose native functions and/or applications (or, e.g., access to such native functions and/or applications) of a device 102. Device 102 can be any mobile communication device; examples of device 100 can include a cellular telephone, laptop computer, a personal digital assistant (PDA), or the like. Communication devices such as device 100 can typically be shipped with a native user interface (UI) 104. Device 102 can include native functionalities, such as communication protocols, data storage features, and communication, data organization, data transfer, and like applications (e.g., placing a remote voice call, referencing voice, text, and e-mail messaging, accessing a remote data network such as the Internet, communicating with a remote data network, and the like) for facilitating remote communication, that are provided to native user interface 102 (e.g., as indicated by the arrows) for presentation to a user. Native UI 104 can expose the rich functionality of device 102 (e.g., mobile communication device, such as a cell phone, or the like) to an end user. Specific examples of UI mechanisms for presenting device 102 functionality to a user can include file folders for navigating stored data, messaging menus for referencing voice, text, and/or e-mail messages, telephone menus for referencing stored telephone numbers, icons that execute device 102 applications such as an Internet icon that initiates communication with a data network such as the Internet, music icons to execute applications related to downloading, playing, storing and transferring music, or the like, or combinations thereof.

System 100 can further include a device presentation component 106 that can create a graphical presentation layer (GPL) to serve as an overlay to the native UI 104 of device 102. Additionally, device presentation component 106 can selectively mask and expose availability of features and subsets of features, provided by native UI 104 to the GPL, of device 102 to an end user. In addition, access to and/or availability of features can be qualified as a function of a user state, preferences, and available resources. Furthermore, in addition to selectively masking and exposing native features of device 102 received via the native UI 104, device presentation component 106 can re-organize a manner in which an end user visualizes and interacts with the native functionality of a device (102). For example, a size and organization of icons can be customized, function menus can be added, edited, or deleted, and access to functions can be grouped according to new logical categories, or combinations of new and old categories or of the like. By way of such mechanisms, device presentation component 106 can enhance productivity and pleasantness of an overall user experience of a device (102). It is to be appreciated that a device presentation component 106 in accordance with system 100 can be turned on and off by a user. If the device presentation component 106 is turned off, a native UI (104) (e.g., a user interface shipped with a device) can become exposed to a user in lieu of a GPL overlay. If a user turns on the device presentation component 106, the native UI 104 can again be overlaid by a GPL and functionality thereof can be selectively masked and/or exposed in accordance with the disclosure herein.

According to additional embodiments, display presentation component 106 can interact with native UI 104 and selectively expose all or a subset of all functionality (e.g., to avoid display clutter) as well as re-organize the location, size, presentation, grouping, etc., of icons, menus, folders, or like UI tools (e.g., to present UI controls in an optimal manner for a particular display area). A common problem can occurs when a device 100 has functions that are logically correlated together, e.g., by name or function, but not bundled and accessible together through the native UI 104. As a result, a user may assume that one or more of a device's functions are unavailable/non-existent if the function(s) is not bundled and/or accessible through an icon that is logically correlated to a name, description, etc. of the function.

As a more particular example, device (102) has a group of application-based icons, e.g., a music group, allowing an end user to access and play music stored on device 100. Furthermore, such device 102 has a group of Internet icons, e.g., an Internet productivity group, or the like, allowing a user to access and interact with data stores and/or applications over the Internet. More specifically, a specific subset of Internet icons within the Internet productivity group enables a user to specifically download and store music from the Internet. The native UI (104) can require access to these music related functions by way of different icons; moreover, a user searching for a ring-tone download function within the music group may assume such a feature does not exist if it is not available in such a manner (even though it is available through the Internet group, for instance). To remedy these and similar problems, display presentation component 106 can selectively bundle and expose disparate native functionality (e.g., contained within the music group, the Internet productivity group, or other related function groups), such as a music player and a music downloader, within a single aggregated functional icon group (e.g., part of the native UI 104, or distinct from native UI 104 interface controls) labeled, for example, Music Group.

In accord with additional aspects of the subject disclosure, display presentation component 106 can access native functionality of device 100 through programming instructions made available through device 100. An example of such a native programming instruction can be one or more connectivity points or portals between device layer applications that can be accessed, executed, read, updated, or the like, by an external function (e.g., device presentation component 106). It is to be appreciated that one of skill in the art of application programming can recognize various methods of accessing native functionality of a device 102 (e.g., a mobile communication device, such as a cell phone, dual-mode or multi-mode phone, or the like) through use of UI programming instructions such as the connectivity points and/or function portals described above. Consequently, aspects of system 100 that include utilizing one or more such points or similar mechanisms to act as a logical interface between native UI 104 and display presentation component 106 are incorporated within the subject disclosure.

Figure 2:
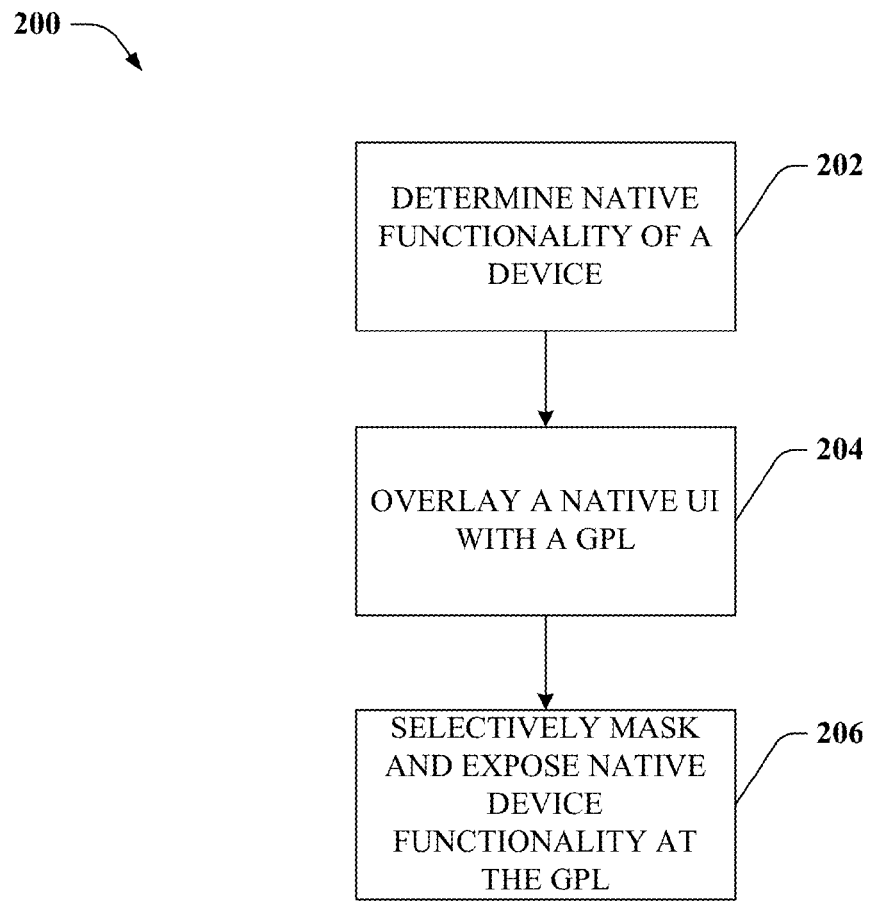
FIG. 2 is a sample high-level flowchart illustrating a method for implementing a Graphical Presentation Layer (GPL) in conjunction with a mobile communication device according to an innovative aspect of the present disclosure.

FIG. 2 depicts an example methodology 200 for implementing a GPL in conjunction with a mobile communication device according to innovative aspects of the subject disclosure. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, native functionality of a mobile communication device can be determined. For example, such functionality can include remote voice calling, Internet access, data applications and services, such as streaming video, concurrent audio, e-mail, instant messaging and/or text messaging, voice mail, storage functions such as phone number directories, photo galleries, digital file storage, message storage, or the like, access and interaction with remote data stores, or the like, or suitable combinations of these and/or like functions. Moreover, the mobile communication device can include a cellular phone, laptop computer, PDA, WiFi phone, VoIP phone, dual-mode device, multi-mode device, or the like.

At 204, a native UI of a mobile communication device can be overlaid with a GPL. For example, one or more connectivity points between the native UI and/or a native function of a device and a graphical presentation layer can be can be configured to activate native UI functions and/or applications in a manner specified by the GPL, or configured to provide access to such functions and/or applications via the GPL. The connectivity points can include a software or firmware portal to an access point of a device application that can be executed by the GPL, for instance. At 206, the GPL selectively masks and exposes native functionality of the device at the GPL to create a new user interface. By way of the specific acts described, methodology 200 can, for instance, provide a new user interface over a device that can increase user productivity and enhance overall user experience of such device.

It is to be appreciated that not all native functionality need be accessed by a GPL as disclosed by methodology 200 or other embodiments of the subject disclosure, described herein. The GPL may access different portions, none, or all of a device's native functionality. Furthermore, it is to be appreciated that a GPL in accordance with the subject innovation can be turned on and off by a user. When the GPL is turned off, a Native UI shipped with the device can be exposed to a user in lieu of the GPL. If a user turns on a GPL interface, the Native UI can again be overlaid by the GPL and be selectively masked and/or exposed in accordance with the disclosure herein.

Figure 3:
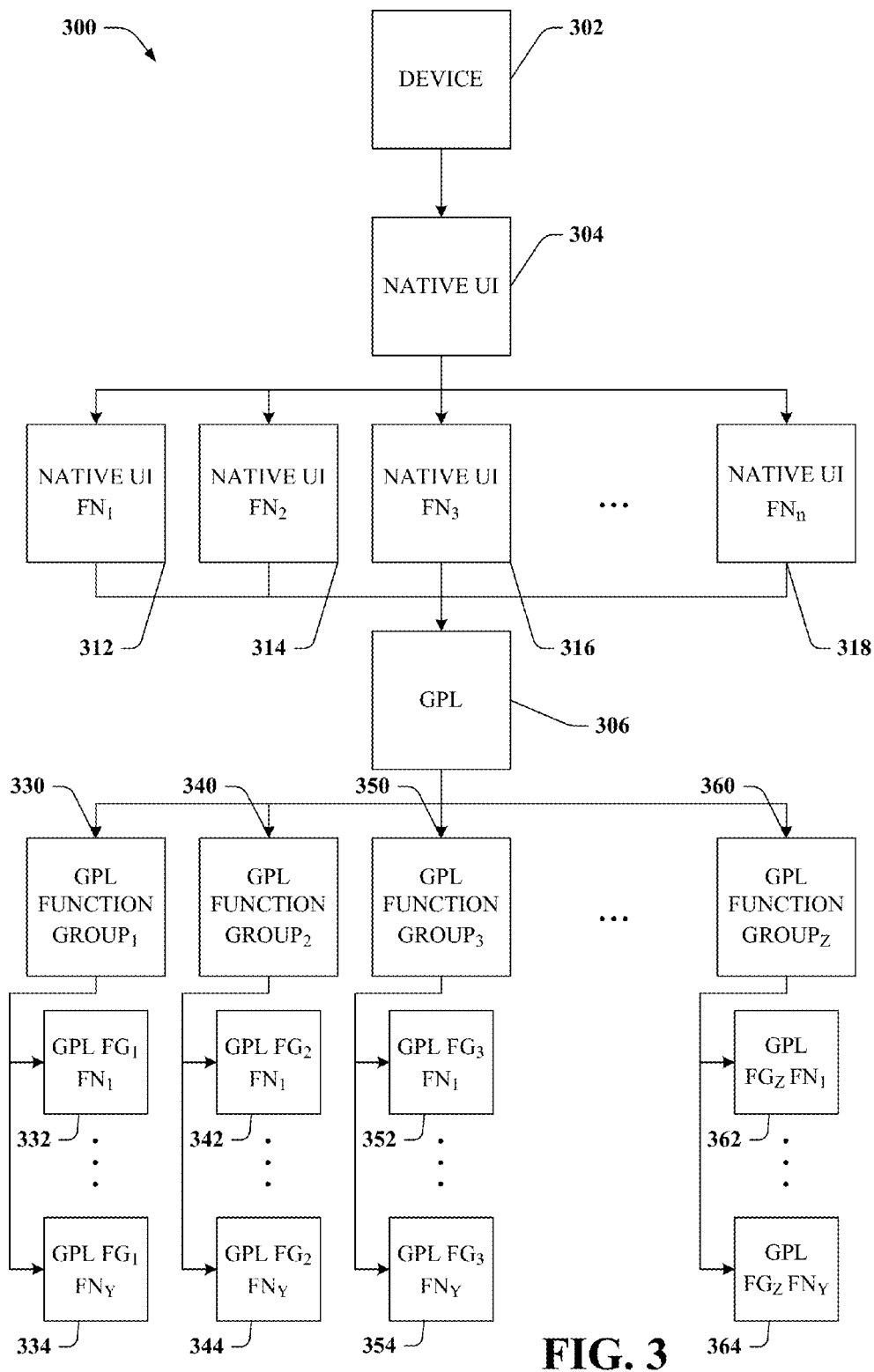
FIG. 3 is an example illustration of a system that overlays a mobile communication device shipped with a native user interface (UI) with a GPL that can selectively mask and/or expose various native UI functions of a device and organize such functions into GPL function groups.

Referring now to FIG. 3, a system 300 is disclosed that overlays a native UI 304 of a device 302 with a GPL 306 that can selectively mask and/or expose various native UI functions (312-318) and organize such functions into GPL function groups (330-360). GPL function groups 330-360 can be logically correlated to functions, features, and/or applications of the device 302 or aspects of the native UI 304 of the device 302, or combinations thereof. In addition, device 302 can be any mobile communication device; examples of which can include a cellular telephone, laptop computer, personal digital assistant (PDA), mobile phone, portable WiFi and/or WiMAX phone, dual-mode communication device, multi-mode communication device, or the like, or combinations thereof. Furthermore, device 302 can typically be shipped with a native UI 304 that can expose rich functionalities and applications to an end user.

Native UI Functions 312-318 can include typical functions and/or applications associated with device 302 and accessible and/or available via a native UI 304. For instance, such native UI Functions 312-318 can include any suitable service, capability, utility, or operation of device 302 incorporated, bundled, and/or packaged with such device, for instance, by a device manufacturer, wholesaler, reseller, service supplier, or like provider. Examples can include remote voice communication (e.g., voice phone call), storing and/or referencing telephone numbers, storing and/or referencing voice, text and e-mail messages, instant messaging, streaming video and/or concurrent audio applications, accessing a communication network (e.g., a mobile network, intranet, the Internet, or the like) and/or components of such network (e.g., network data store, application servers, or the like) and transferring data to and from such network and/or component. More specifically, data transfer applications can include downloading, playing, storing and transferring music, games, business applications (e.g., banking or accounting applications, stock and bond valuations, etc.), navigation applications (e.g., maps, driving directions, real-time traffic, weather, and/or local event news updates relevant to navigation, etc.), viewing recent call histories, e-mail and e-mail applications, and like functions and applications compatible with communication devices, or combinations thereof. It is to be appreciated that any suitable function known to one of skill in the art to be compatible with a communication device as described is included within the spirit and scope of aspects of the claimed subject matter. Moreover, the subject disclosure should not be construed so as to limit the claimed subject matter to the specific embodiments articulated and/or depicted in the subject disclosure.

Native UI 304 and its associated native UI functions 312-318 can be overlaid by GPL 306, which can selectively mask and expose native UI functions 312-318 to a device (302) user. GPL 306 can be sub-divided into GPL function groups 330-360. GPL function groups 330-360 can selectively mask or expose all or a subset of all of the native UI functions 312-318 of device 302 related to a name, title, function, and/or purpose of each GPL function group (330-360). In addition, native functions exposed by GPL function groups 330-360 are referred to individually at FIG. 3 as GPL function group (FG) Functions (FNs) 332-334, 342-344, 352-354 and 362-364.

GPL function groups 330-360 can be displayed simultaneously as tiled graphic object icons, or comparable user interface representations, on a display of device 302. Furthermore, GPL function groups 330-360 can be selectively hidden or displayed. More specifically, when a user selects one or more of GPL function groups 330-360 (e.g., via a user interface display, keypad, stylus, etc.), for instance, the selected function group (330-360) can be displayed as graphically distinct from other function groups (330-360). Additionally, a list of functions (332-334, 342-344, 352-354, 362-364) corresponding to a selected GPL function group (330-360) can be selectively exposed to a user in a manner unique to the GPL 306. For example, a user can select a music function group icon that serves to graphically represent GPL function group$_1$ 330. When such music function group icon is selected, GPL function group$_1$ 330 can be graphically distinguished from other function groups (340-360). Furthermore, all or a subset of all of the GPL function group functions (GPL FG$_1$ FN$_1$-GPL FG$_1$ FN$_Y$ 332-334) that correspond to GPL function group$_1$ 330 can be exposed to a user via a display of device 302, for instance.

Similar suitable examples to the foregoing are also contemplated within aspects of system 300. For instance, multiple GPL function groups (330-360) can be selected by a user and consequently rendered graphically distinct at a display of device 302. Additionally, various mechanisms for rendering a portion of a display (e.g., a graphical icon, menu, or the like) graphically distinct are contemplated within embodiments of system 300, such as highlighting, shading, emboldening, coloring, or animating such portion of the display, or like mechanism. As a specific example, a GPL 306 can support an application that navigates through a series of home page background art screens. For instance, several wallpaper files can be loaded onto a device, and an application can enable a user to select (e.g., via press of a button or consecutive button presses, verbal command(s), or the like) between various home screen wallpaper files for display on a device. Alternatively, a user can establish preferences (e.g., within a user-specified preference stored in memory, as described at FIG. 7, infra) for a particular wallpaper under various determinable conditions (e.g., time of day, location, user locale such as office, home, restaurant, shopping complex, etc., weather, local news, or the like), and a device can display home screen art in accord with such preferences and determined conditions. Additionally, a device can automatically select one of the wallpaper files (e.g., conditioned on user activation of automated home screen art) based on user preferences, user mood, locale, user selection (e.g., a device option presented to a user), theme, global information determined from a group of networked users, or the like (e.g., as discussed in more detail in regard to machine learning component 702 at FIG. 7, infra).

As an additional example, a GPL 306 can include support for multiple simultaneous applications (e.g., messaging such as e-mail applications, IM applications, JAVA applications, media such as song player and display, and like applications that can be native to a device as well as $3^{rd}$ party applications provided on a device or loaded by a device user) that can communicate with the GPL 306 and provide status information related to the application. For instance, a GPL can enable a user to be logged into one or more messaging applications simultaneously, and can apportion such applications to all, a portion, or none of a display. As a more specific example, an e-mail application (e.g., run as a JAVA application) can communicate with GPL 306 when a new message comes in, and provide a new message indication (e.g., display, icon, highlighted icon, auditory sound or ring, device vibration, or the like) via the GPL 306. The new message indication can be appended to a display dashboard, for instance, summarizing recent message, communication, and/or response activity for that application. In addition, the display dashboard can comprise a summary of multiple messaging accounts (e.g., multiple e-mail, IM, SMS, etc.) on the dashboard and/or on multiple selectable dashboards. Moreover, a user can switch between one application and another by selection, and thereby render one application (and/or an associated summary) active, and another passive. Additionally, applications can re-configure display icons, fonts, colors, highlights, etc., as appropriate for to the active application. Such re-configuration can help distinguish between one active application and another.

Yet another example of an application can include real-time display of user device billing, account, and memory information. For instance, a user communication service can include a finite number of voice call minutes, a finite number of e-mail messages, a finite number of text messages, a finite number of bytes downloaded or stored in device memory, or a finite number of connection minutes on a data network (e.g., the Internet), or the like. A particular application compatible with GPL 306 can include a dashboard summary of service usage and/or storage space. The summary can include graphical (e.g., including charts and graphs, and different colors and highlights representing used resources versus available resources versus overage minutes/bytes/ connections and the like) and textual information. For example, a device can perform a data dip with a communication network and retrieve information related to a user's status at a particular point in time. The data dip can be done periodically, as well as on user command, or as a result of a trigger (e.g., activating a particular application of a device, such as a summary application, or activating a calling or messaging application, or based on certain conditions, such as an overage condition, or being within a threshold percentage of overage, or the like). Additionally a device can display information related to onboard and/or network memory available for data/media storage. The GPL 306 can display the account status information relevant to an application or service to provide periodic and/or triggered feedback with respect to a user's account information. As described, various example applications and display options can be incorporated into GPL 306, GPL function groups (330-360), and GPL function group functions (332-334, 342-344, 352-354 and 362-364), not all of which can feasibly articulated within the scope of the subject specification. Consequently, other mechanisms for distinguishing portions of a user interface and/or display of a device (302), applications executable in conjunction with a GPL (306), and associated display and presentation options, known in the art or made known to one of skill in the art by way of the context provided by the specific examples articulated herein are incorporated within the subject disclosure.

Figure 4:
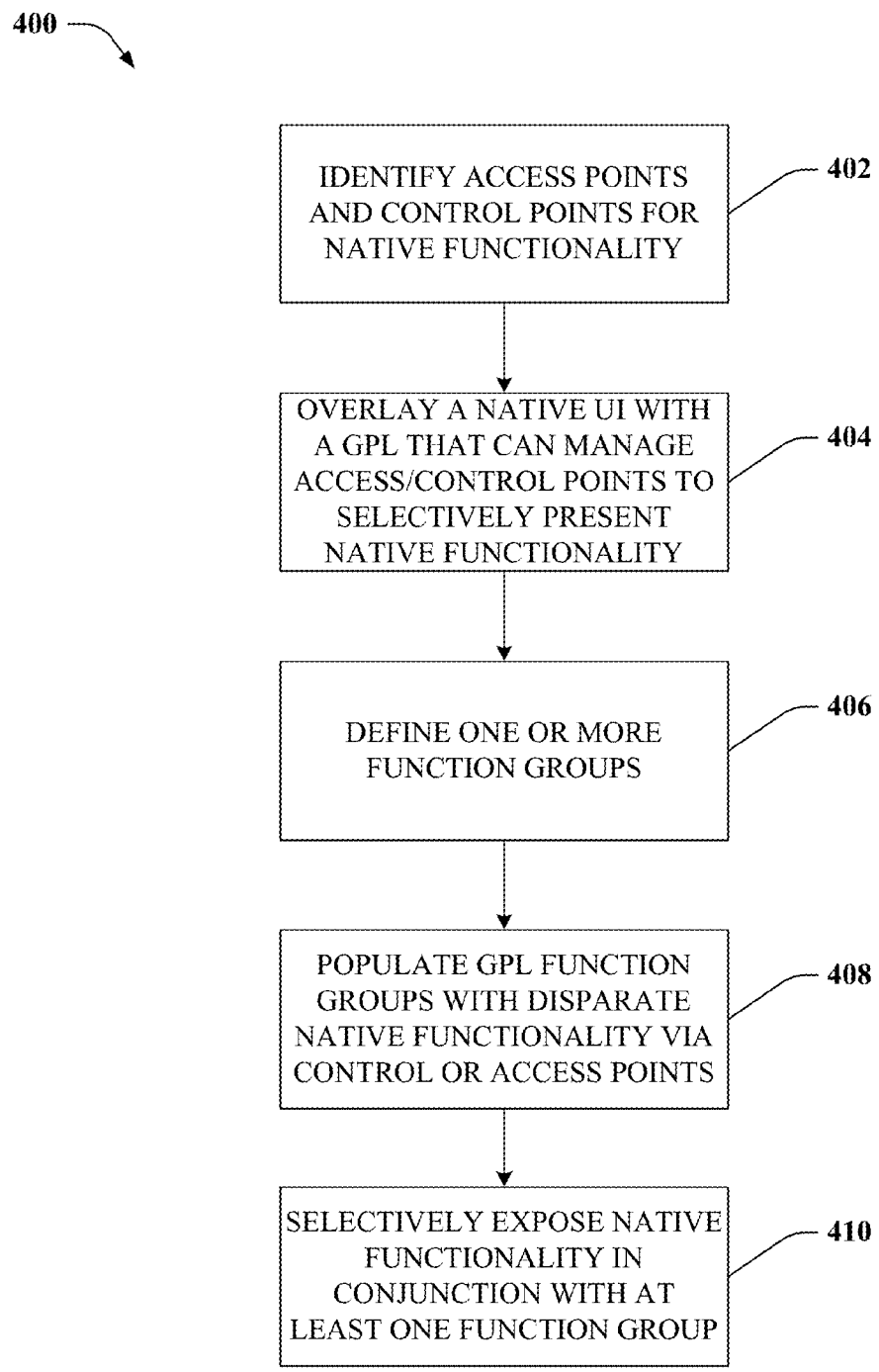
FIG. 4 is a sample high-level flowchart that illustrates a methodology for populating function groups of a GPL with function icons logically associated with each other by a particular function.

Referring now to FIG. 4, a methodology is illustrated for re-organizing a native UI of a device via a GPL in accordance with additional aspects of the subject disclosure. At 402, a native UI is queried to identify access points and/or control points for native functionality of a device (e.g., mobile phone, laptop, PDA, or the like). Control functions can include, for example, device layer application calls that instruct a native control program on a device to execute one or more native functions, applications, or features. At 404, a native UI of a device is overlaid with a GPL that can selectively present such native functionality (e.g., device functions, applications, features, or the like). At 406, one or more function groups are defined. A function group can correlate and/or associate individual aspects of device functionality by a common category, purpose, aspect, or the like. For example, a music function group can correlate and provide common reference and access to individual features, applications, and/or functions of a device that store, play, search for, share, identify, copy, etc., musical files, recordings, or the like. As another example, a settings function group can correlate and provide common reference and access to features, applications, and/or functions of a device relating to user preferences, device operation (e.g., ring, playback, or speaker volume, display brightness, device alarm tones and operations, or like logical and/or user interface operation, appearance, etc.), device performance, device defaults, Bluetooth settings, connectivity settings, browser settings, or the like. Additional examples of function groups can include, for instance, messaging, home page, media/Internet, and phone calling. A phone calling function group can organize and expose all native functionality associated with voice telephony, such as voice messaging, call forwarding, call waiting, 3-way calling, call histories, and caller ID history, or the like.

At 408, at least one GPL function group can be populated with and expose a subset of native functions that are correlated with the GPL function group. It should be appreciated that the native functions can be disparate as organized by the native UI of a device. For instance, the GPL can provide access to portions of disparate icons, such as an Internet icon, a Music icon, and a Settings icon, etc., of the native UI via a common GPL function group. The native functions can include any of those mentioned previously, or like functions logically correlated with a name, purpose, etc., of a function group (e.g., a music playback function can populate and be exposed by a music function group, etc.) Additionally, disparate native functions can populate and be accessed via multiple GPL function groups. A function that enables searching and downloading music, ring tones, or the like from a remote network can be exposed via a music function group or an Internet/media function group, or both, for example. At 440, native functionality can be selectively presented to a user (e.g., if such user selects one or more GPL function groups referencing and/or exposing such native functionality).

Figure 5:
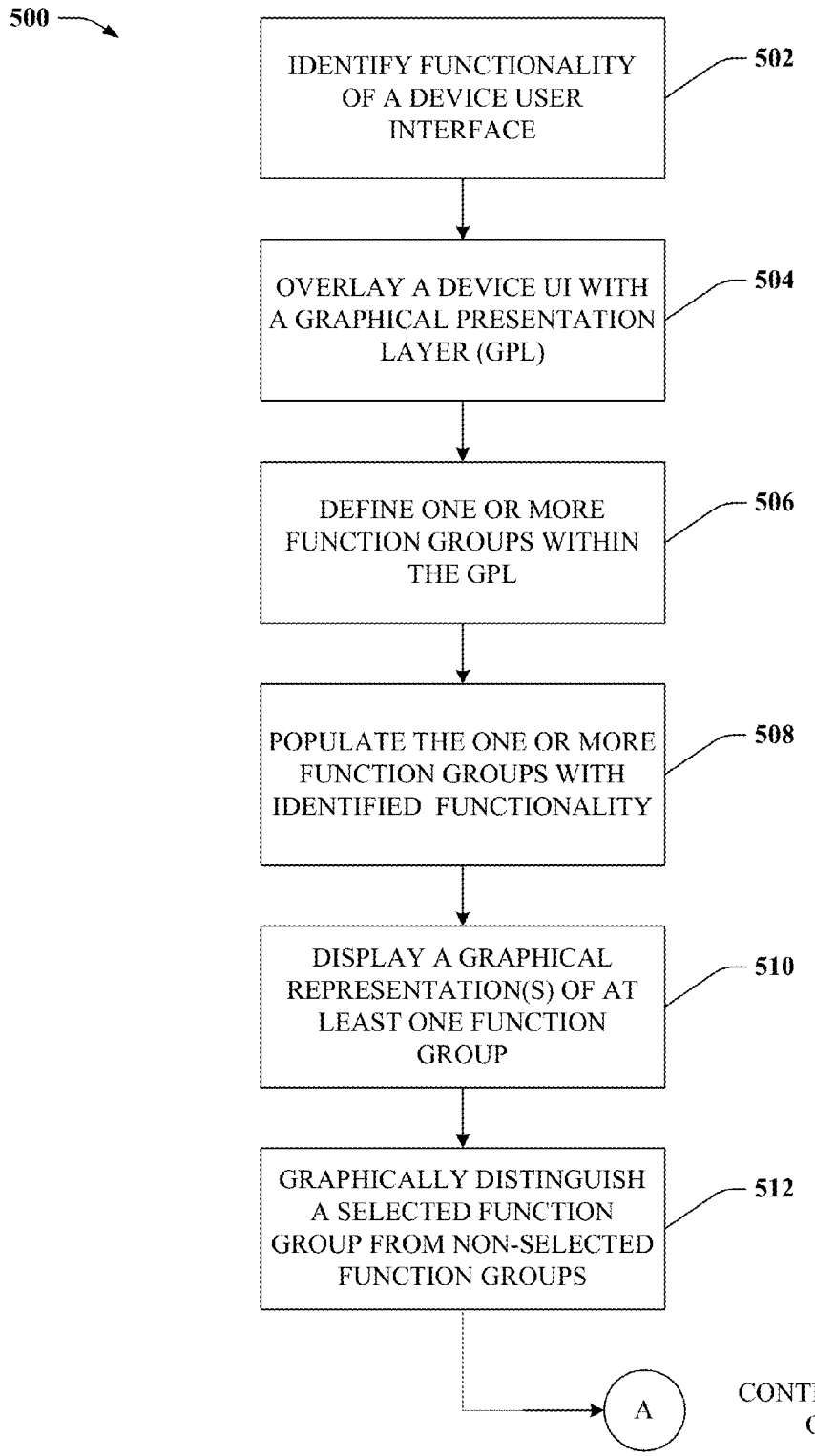
FIGS. 5 and 6 illustrate a sample flowchart of an example methodology for populating GPL function groups with function group icons and graphically distinguishing selected icons from non-selected ones.
Figure 6:
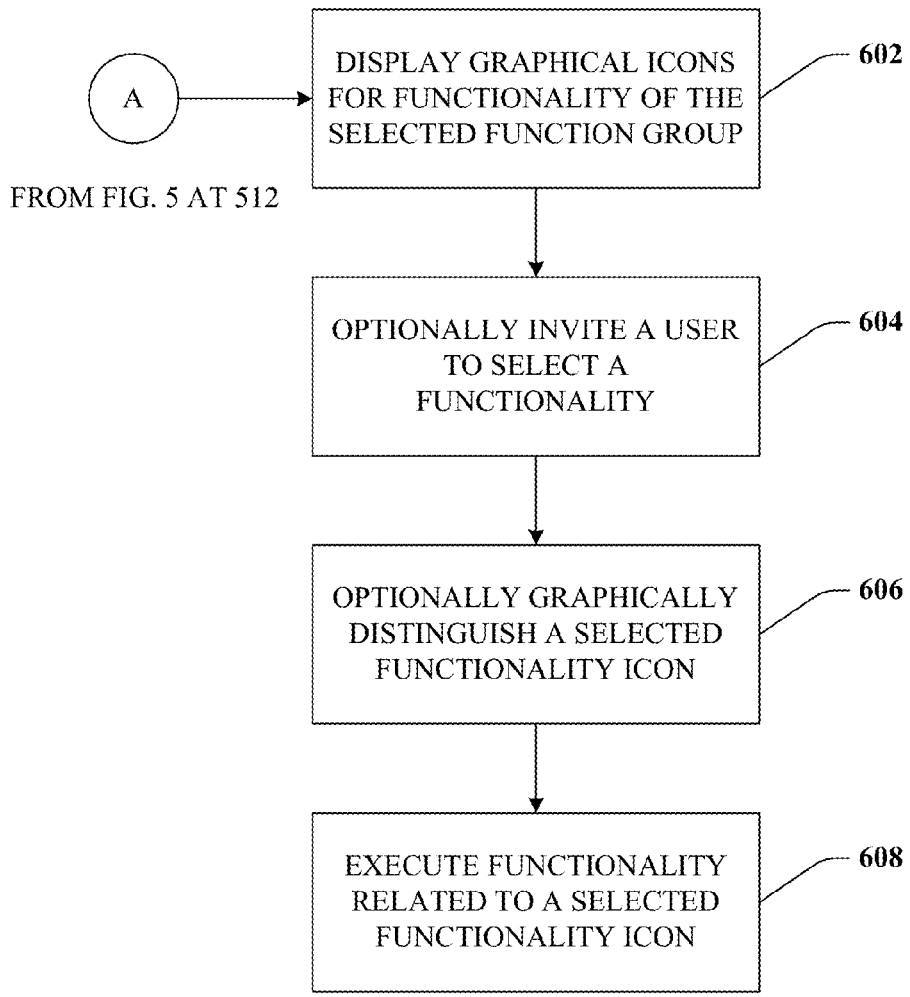

Referring now to FIGS. 5 and 6, a methodology 500 is illustrated in accord with additional embodiments of the subject innovation. At 502, functionality of a user interface of a device can be identified. Such functionality can include device features, functions, and/or applications relating to voice and/or data communication, display of information, access to remote networks, network components and/or data available thereon, user interface settings and/or controls, or like logical operations of a device. At 504, the user interface of the device can be overlaid with a GPL that can selectively mask and expose one or more identified functionalities. At 506, one or more function groups related to aspects of the identified functionality can be defined within the GPL. For instance, aspects of the identified functionality enabling access to, execution of applications over, and/or transfer of data with the Internet (and, e.g., with data stores, servers, and the like connected to the Internet) can relate to an Internet or media function group. Thus, function groups can provide access to disparate portions of native functionality of a device that are logically correlated to a name or title associated with a function group.

At 508, the one or more GPL function groups are populated with all or a subset of all identified functionality of the device. Such identified functionality can be from disparate portions of a native UI and logically correlated to a name or title associated with a GPL function group. Organizing disparate functionality via such logical correlation can assist in locating functionality and to increase user-friendliness of the GPL. For instance, functionality logically related to music can be correlated to a music function group, functionality logically related with Internet access can be correlated to an Internet function group, functionality logically related with user preferences, device options and maintenance, etc., can be associated with a Settings and/or options function group, or the like, or combinations thereof. Additionally, such functionality can be organized in various dissimilar portions of the native UI. More specifically, it should be appreciated that particular functionalities can be associated with more than one function group. A musical download application that searches, identifies and downloads songs from an Internet site can be logically correlated, and thus accessible, via an Internet function group, music function group, or the like, or combinations thereof. Additionally, it should be appreciated that a function group (and, e.g., functionality populating such function group) can be presented to a user via conventional user interface representations, such as one or more graphical display icons, graphical display menus, buttons, indicators, or audio or other visual indicators, or the like.

At 510, a graphical representation (e.g., icon(s), led indicator(s), menu(s), etc.) of at least one function group can be displayed (e.g., on a graphical display of a device). Such graphical representation can enable a device user to select one or more function groups (e.g., to access and/or view functionality logically correlated to the function group). At 512, a graphical representation of a selected function group is graphically distinguished from non-selected function groups. For instance, a selected function group icon can be highlighted, emboldened, italicized, shaded, colored, enlarged, reduced, placed within, surrounded by, or otherwise graphically set off by a folder icon, or like mechanism for graphical distinction, or combinations thereof.

Methodology 500 proceeds from FIG. 5 at 512 to FIG. 6 at 602, where a graphical representation of functionality of the selected function group is displayed. Similar to the graphical representation of function groups, functionality can be graphically represented via icons, menus, rows, columns, folders, groupings, categories or the like, or combinations thereof, suitable to identify a particular functionality. It should be appreciated, that in accord with reference number 602, sub-groups, sub-categories, or the like, associated with the selected function group can be displayed (e.g., in conjunction with functionality, or in lieu of functionality, or the like). More specifically, a function group can contain function sub-groups, sub-sub-groups, and the like, that provide access to functionality within the function group, that are further logically correlated to a sub-group folder, or the like. For instance, an audio player sub-group can exist within a music function group, and further categorize functionality related to the music function group associated with music player controls (e.g., play, stop, pause, record, delete, track skip, song select, etc., related to an audio player application).

At 604, a user can optionally be invited to select a functionality (or, e.g., a function sub-group or the like) graphically represented at reference number 602 (e.g., via a graphical icon or like representation). For example, text, graphical and/or auditory indication from a device can prompt a user to select a function, feature, application, function sub-group, etc. (e.g., to access functionality of a device). At 606, a selected functionality icon can optionally be graphically distinguished from non-selected functionality icons. At 608, user interface functionality related to the selected functionality icon can be executed. By way of the acts described or according to substantially similar acts, methodology 500 can overlay a device's user interface with a graphical presentation layer. Such graphical presentation layer can selectively expose and reveal functionality to enhance presentation and productivity associated with a device in accord with aspects of the subject disclosure.

Figure 7:
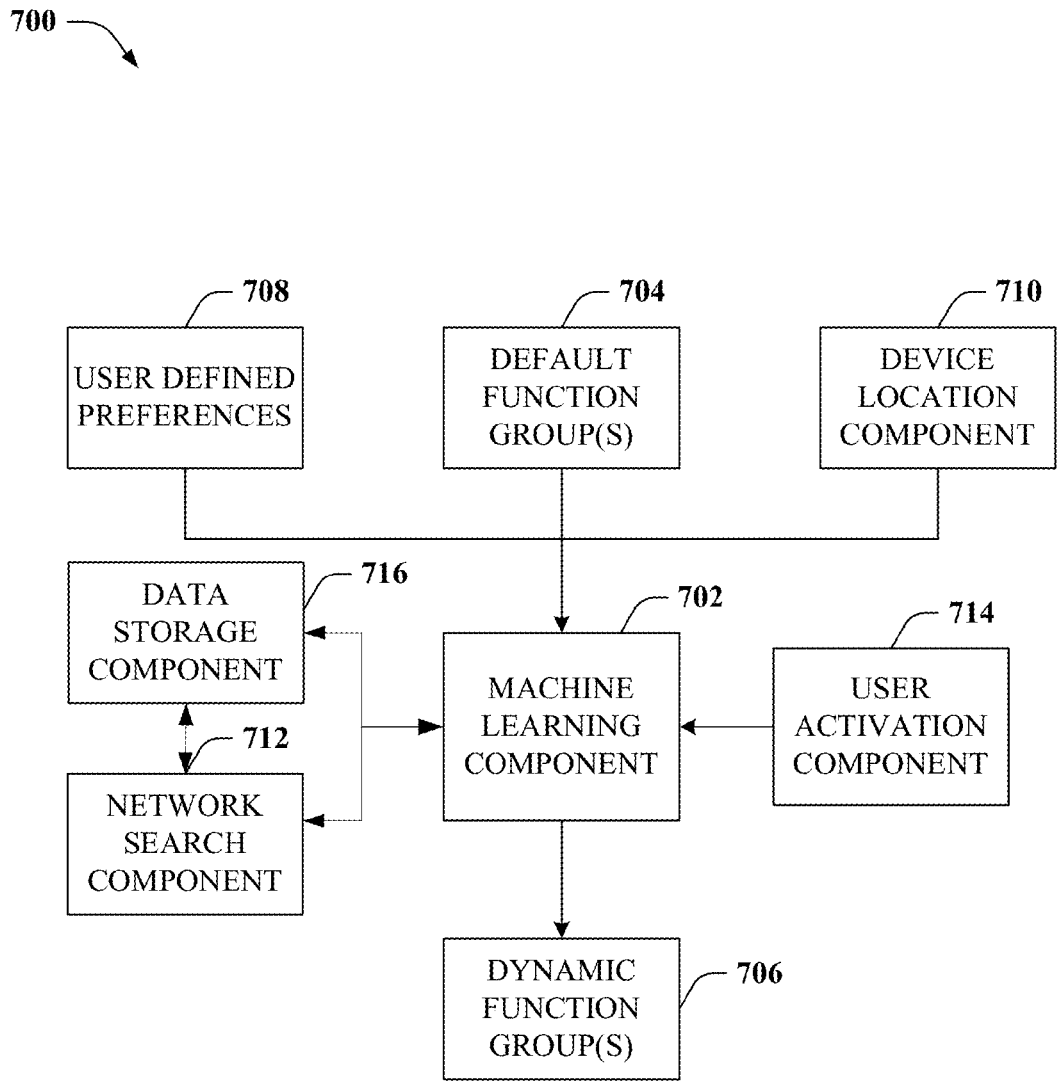
FIG. 7 illustrates an example system that can modify a presentation of native functionality of a device in accord with user specifications and situational context of a user.

Referring now to FIG. 7, a system 700 is disclosed that can modify a GPL overlay described herein in accord with user specifications, usage history and/or situational context of a user. More specifically, a machine learning component 702 can analyze a default function group 704 associated with the GPL and customize the makeup and/or presentation of such default function group 704 in accord with user preferences, usage history, and/or concurrent environment to create and update a dynamic function group(s) 706. The dynamic function group(s) 706 displayed at a device can therefore be updated as a user's locale changes (e.g., through travel to different locations) in accord with user-defined preferences 708 and usage history. A device location component 710 can determine a location of a device utilizing network, device, and/or combination network/device location techniques (e.g., a global positioning or like system, network location register, or the like). Furthermore, a network search component 712 can identify contextual information associated with such location (e.g., by utilizing search and location applications on the Internet or other public/private communication networks). In such a manner, system 700 can provide a user interface adapted to desires and situational context of a particular user.

System 700 can be activated and de-activated by user control, to enable or disable updating customized dynamic function groups 706 described herein. A user activation component 714 can enable and disable a GPL (not shown) associated with system 700, alternating a display of a device between a native UI and the GPL that serves as an overlay to the native interface. Alternatively, a user activation component 714 (e.g., an on/off command, button, menu item, or the like associated with dynamic function group(s) 706) can selectively activate and de-activate a machine learning component 702 associated therewith. While machine learning component 702 is de-activated, native functionality of a device is masked and exposed at a GPL according to logical correlation with default function group(s) 704, as described supra. In contrast, while machine learning component 702 is active, functionality can be selectively exposed or masked in accordance with logical correlation with dynamic function group(s) 706, created and updated by machine learning component 702 in accordance with user preferences and user environment.

User specified preferences 708 can include UI defaults established by a user and stored within a data storage component 716. Data storage component 716 can be proximate a device, a compilation of devices having a communication link with a network, a communication network and/or component thereof, service provider equipment, or interactions between such components or combinations thereof. UI defaults included within user specified preferences 708 can include suitable device parameters related to device operation and/or functionality (e.g., as described supra or as known in the art) that can vary in accord with a user's specifications. Examples can include one or more functions (e.g., Internet music shortcut) mapped to one or more hotkeys, a preferred music play list or play list order, pictures or like graphical images utilized as 'wallpaper' of a display, customized selection and display of function groups, sub-groups and the like, and choice of functionalities included in such function groups/sub-groups, 'favorite' web addresses or the like, device operations and settings, visual display qualities (e.g., brightness, color, shading, contrast, etc.), graphical icon highlights, indicators, or the like to distinguish user-selected function groups, icons, and/or functionalities, etc., or suitable combinations thereof. In addition, data storage component 716 can be accessed by a communication network to store and/or compile information from various devices and associated user profiles communicating with the network, within an area or multiple areas, or the like. Such compilation of data can be applied (e.g., by machine learning component 702) to customizing a GPL of a particular user, or groups of users.

User specified preferences 708 can also include criteria that machine learning component 702 can utilize to determine between one of multiple preferred device parameters. For instance, a time of day (e.g., morning, afternoon, evening), locale (e.g., driving, shopping in a mall, dining, at home, at work, on vacation, etc.), local weather, device location, nearby attractions (e.g., entertainment, shopping, dining, recreational, etc.), and/or like situational criteria related to a device can be utilized to distinguish between one or more device parameters, or like variations. Such criteria can be obtained, for instance, by monitoring a device location (e.g., via device location component 710) and obtaining information pertaining to the location via network search component 712. Those of skill in the art can appreciate many suitable variable UI parameters associated with a device, and/or contextual criteria applicable to a user preference schema, and mechanisms for incorporating such a schema to a custom presentation of UI functions of a mobile device. Consequently, such methods known in the art or made known to one of skill in the art through the context provided by the instant examples are incorporated into the subject disclosure.

In accord with additional aspects of the claimed subject matter, system 700 can update a GPL depending on a location and situational context of a user and/or information compiled from a group of related users. Device location component 710 can determine a contemporaneous location of a device (e.g., mobile phone, multi-mode phone, laptop, PDA, etc.) and provide that location to machine learning component 702. More specifically, device location component 710 can include a global positioning system (GPS) or a substantially similar satellite-based location system, a network location register (e.g., a visited and/or home location register associated with a Global System for Mobile communication (GSM) network, or like network component) that can determine a location of a mobile network device, or like location device, or combinations thereof. In addition, device location component 710 can determine a rate and direction of travel of a device, e.g., through successful location determinations and time measurements. Location and/or movement information determined by location component 710 can be forwarded to machine learning component 702 to facilitate customization of dynamic function group(s) 706 displayed at a GPL.

Network search component 712 can include an executable process, processor, and/or the like capable of searching network data stores and servers, and/or executing network applications thereon. Such applications, data stores and servers can be referenced to identify information pertaining to a global position (e.g., global coordinate position, postal system mailing address, or the like) of a device, or along a direction of travel of such device. More specifically, information can include weather, temperature, time of day, surrounding stores, businesses and shops, local sporting events, news and traffic, and like information. Typical Internet data stores can be referenced for such information, including travel, shopping, weather, business location sites, mapping and driving direction sites, and the like. In addition, data stores and servers of private or public intranets or communication networks can be referenced to determine such information as well. Furthermore, data compiled within data storage component 716 can be referenced and utilized by network search component 712 (e.g., containing user preferences associated with a device and/or user, as well as information compiled by a network related to multiple users within a vicinity of a particular device, and the like). Similar to device location component 710, network search component 712 can provide information to machine learning component 702 for processing. In such a manner, machine learning component can create new dynamic function groups (706) based at least in part on an environment and/or situational context of a user and/or groups of related users.

Machine learning component 702 can create dynamic function group(s) 706 and populate such function groups in accord with predetermined UI parameters established by user defined preferences 708, device usage history, data compiled at data storage component 716, and also in accord with concurrent user environment/situational context. More specifically, a particular theme, such as sports, entertainment, music, business, stock and trade data, local, national or global news, or combinations thereof or of the like can form the basis for a user preferred function group, having device functionality logically correlated to the specified theme (and, e.g., obtained from disparate portions of the native UI). As a specific example, a user can specify that a business function group be displayed during work hours or while a user is at work, an entertainment function group be displayed during evenings, while at dinner or at a bar or nightclub, or the like. Machine learning component can determine a location of a device (e.g., proximate a user's office, or proximate a bar, shopping complex, theatre, nightclub district, etc.) and time of day (e.g., before or after 6 pm, local time) and update dynamic function group(s) 706 with either a business and/or an entertainment function group.

Additionally, changes made by machine learning component 702 can be made automatically, or proposed for display at the GPL. In such a manner a user can select which changes proposed by machine learning component 702 should be enacted. Furthermore, an automatic change can be undone, or reversed by a user if desired. Furthermore, a user profile can enable and disable portions of machine learning component 702, such as what data can be accessed (e.g., data compiled by multiple devices of a particular demographic, of a particular corporate group, user group, service plan group, etc., or just a single device's location and situational context, etc.), what functions can be proposed, whether changes can be automatically executed or proposed to a user. How a proposed modification or function group is indicated to a user (e.g., highlighted, indicated graphically, by audio tone, or the like).

Device usage history can be stored on data storage component 716 and referenced by machine learning component 702 to update and/or create dynamic function group(s) 706. For example, if a dynamic function group associated with entertainment is created, but accessed less frequently than other function groups (e.g., default function group(s) 704 or a dynamic function group 706), it can be weighted appropriately by machine learning component 702. Such a weight can be utilized to determine whether a custom function group (706) will be displayed at a GPL. Additionally, usage history can be utilized by machine learning component 702 to organize a display of functionality within a particular function group (704, 706). For example, if local movie listing, local dining, and local nightclub Internet shortcuts are all frequently used, e.g., relative to other functions or relative to a default threshold, or a combination thereof, such shortcuts can be featured within a function group(s) (e.g., highlighted, or otherwise indicated as favorite functions, etc.), displayed directly within a selected function group, abbreviated on a home page in relation to a displayed and/or selected entertainment function group, or the like. Conversely, if a local sporting event shortcut is used less frequently (e.g., with respect to other features, thresholds, combinations thereof or of the like, etc.), such a feature can be located within a sub-group of an entertainment function group, minimized, displayed as less distinct, hidden, or the like. Consequently, system 700 can graphically feature functionality often utilized by a user, to improve access to such functionality and augment overall UI productivity.

The machine learning component 702 can utilize a set of models (e.g., user preference model, usage history model, general network user model, compiled from multiple user preferences and/or device user histories connected with a network, device functionality model, etc.) in connection with determining or inferring which function groups (706) to display based on a given set of determined criteria. The models can be based on a plurality of information (e.g., user-specified UI parameters, functionality weighted as a result of frequency of use, environmental context described herein, etc . . . ). Optimization routines associated with machine learning component 708 can harness a model that is trained from previously collected data, a model that is based on a prior model that is updated with new data, via model mixture or data mixing methodology, or simply one that is trained with seed data, and thereafter tuned in real-time by training with actual field data during use and non-use of a device UI or data compiled from multiple devices.

In addition, machine learning component 702 can employ learning and reasoning techniques in connection with making determinations or inferences regarding optimization decisions and the like. For example, machine learning component 702 can employ a probabilistic-based or statistical-based approach in connection with choosing between function groups displayed at a GPL, populating such function groups and sub-groups thereof with device functionality, highlighting particular functionality, etc. The inferences can be based in part upon explicit training of classifier(s) (not shown) before employing the system 700, or implicit training based at least upon one or more device user's previous input, choices, and the like during use of the device. Data or policies used in optimizations can be collected from specific users or from a community of users and their devices, provided by one or more device service providers, for instance. For instance, if a group of user's are all densely located at a particular sporting event, classifiers can be dynamically retrained to compile data from all such users or relevant groups of such users so as to modify a GPL and functions groups thereof for a particular user based at least in part on data compiled from the group (e.g., functions utilized by the group, historically or concurrently, group user histories, the teams at the sporting event, the weather at the event, score/status of the event, etc.), In addition, it should be appreciated that a user profile of a device can indicate whether information compiled from multiple related (e.g., geographically) devices, or only information determined about a particular device should be utilized to train classifiers and update a GPL of a device.

Machine learning component 702 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Methodologies employed by machine learning component 702 can also include mechanisms for the capture of logical relationships such as theorem provers or more heuristic rule-based expert systems. Inferences derived from such learned or manually constructed models can be employed in optimization techniques, such as linear and non-linear programming, that seek to maximize some objective function. For example, maximizing an overall efficiency of a device UI particular to the needs of a user taking into consideration contemporaneous context such as time of day, locale, weather, rate of travel, if any, surrounding businesses, shops, stores, and the like, predetermined user preferences, usage histories, and so on.

In the manner described above, system 700 can satisfy user preferences, complement a user mood or locale, and augment a user-experience of a particular user of a device. It is to be appreciated that one of skill in the art could recognize many methods for exposing or masking user interface functionality to complement a particular user based on the context provided by the embodiments articulated herein. The subject innovation, however, should not be limited to the specific examples articulated in this disclosure. Instead, all suitable means known in the art to dynamically determine a location, context and/or environment of a device/user and/or modify a device UI to reflect such information are incorporated into the subject specification.

Figure 8:
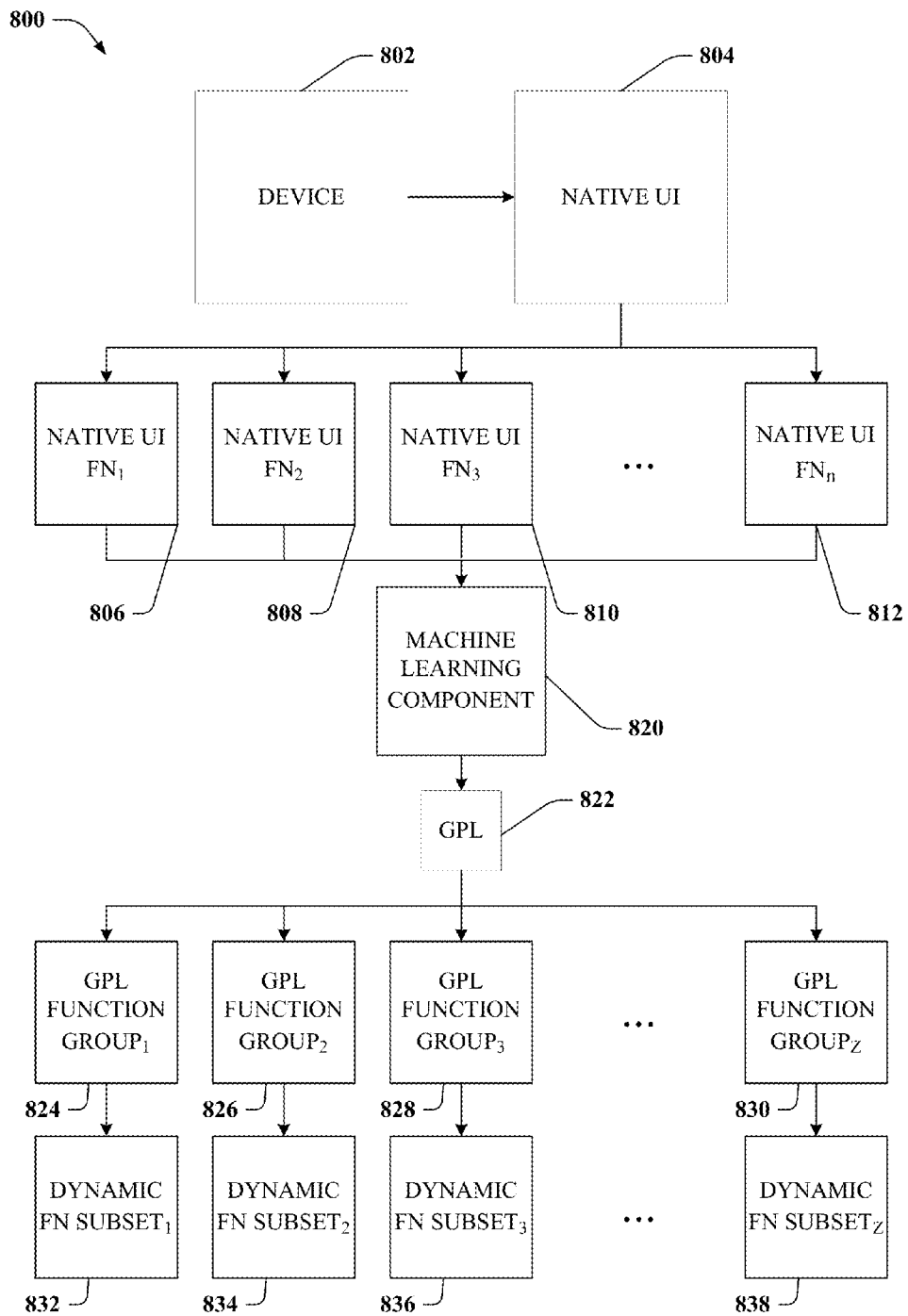
FIG. 8 illustrates a sample block diagram of a system that enhances a user experience of a particular device user by using a machine-learning component to dynamically organize UI functionality according to user preferences and objective criteria determined about a device user.

FIG. 8 illustrates a system 800 for enhancing an experience of a particular user of a device, by using a machine-learning component to dynamically organize UI functionality according to user preferences and objective criteria known about a user. Device 802 can be any mobile communication device; examples can include a cellular telephone, laptop computer, a personal digital assistant (PDA), and the like. Mobile communication devices such as device 802 are typically shipped with a native UI 804. Native UI 804 can typically expose the rich functionality of mobile communication devices to end users; examples of which can include placing a phone call, referencing stored telephone numbers, referencing voice, text and e-mail messages left for a user, accessing the Internet and viewing and transferring data to and from the Internet, downloading, playing, storing and transferring music, viewing recent call histories, displaying pictures, video, and/or artwork on a device display, and the like.

Native UI functions 806-812 are specific functions that can be provided to and exposed via native UI 804 from device 802, and can include any suitable service, capability, utility, or operation of a device included with a device UI including those specified above and elsewhere herein. Additional examples of native UI functions 806-812 can include storing and referencing voice messages, sending, receiving, storing and referencing text messages, e-mail, instant messages, streaming video, and streaming audio. One of skill in the art would be aware of numerous functionalities available to a mobile communication device. Such functionalities known in the art, or made known to one of skill in the art by way of the context provided by the examples articulated herein, are included within native UI functions 806-812 are also incorporated herein.

Additionally, native UI functions 806-812 can be connected to native UI 804 via connection points that enable access to native device applications. As described supra, such connection points can be utilized to execute functionality of device 802, modify such functionality, and bundle it within a GPL in various manners as described herein.

Machine learning component 820 can analyze native UI functions 806-812 and compare them with user-specified preferences and objective criteria known about a particular user of a device or multiple related device users on a network to determine an optimal UI presentation suited for a particular user at a particular point in time. Objective criteria can include the time of day, user location and/or locale, rate and direction of travel, and like factors described herein or known in the art. Machine learning component 820 can organize native device functionality (806-812) in accord with user preferences, objective criteria and usage history, as described supra, and submit organized functionality to a GPL 822.

Such GPL can overlay a user interface of a device with a home page display comprised of at least one or more GPL function groups 824-830 that selectively expose or mask native features and functionality of a device. Functionality accessible through a particular function group (824-830) can be pulled from disparate portions of a native UI and logically correlated to a name or tile etc. of the function group (824-830), as described supra. In addition, GPL 822 can modify GPL function groups 824-830 and UI functionality associated therewith in accord with information provided by machine learning component 820. As a specific example, GPL 822 can update GPL function groups (824-830) to include a shopping function group if information provided by machine learning component 820 indicates such a function is appropriate (e.g., if a device is located in or around shopping stores for a significant period of time, or the like). Consequently, functionality associated with the shopping function group, and potentially with other function groups, can be modified so that such functionality is logically correlated with the name/title of the new GPL function group set (824-830).

Additional examples of specific GPL Function Groups can include one or more music groups, messaging groups, options and settings groups, phone call groups, home page groups, internet media groups, entertainment groups, business groups, shopping groups, finance groups, etc. Dynamic Function Subsets 832-838 are subsets of native UI functions 806-812 logically correlated by a purpose, title, name, application, objective, etc., associated with a function group, and satisfying user preferences and objective criteria known about a particular user of a device. Such native UI functions 806-812 can then be re-organized by machine learning component 820 and selectively masked or exposed by GPL 822 to create dynamic function subsets 832-838, which populate the GPL function groups 824-830. It is to be appreciated that machine learning component 820 and/or GPL 822 can be separate components with capabilities specified herein or known in the art or a single component incorporating capabilities of either individual component described herein or known in the art.

Figure 9:
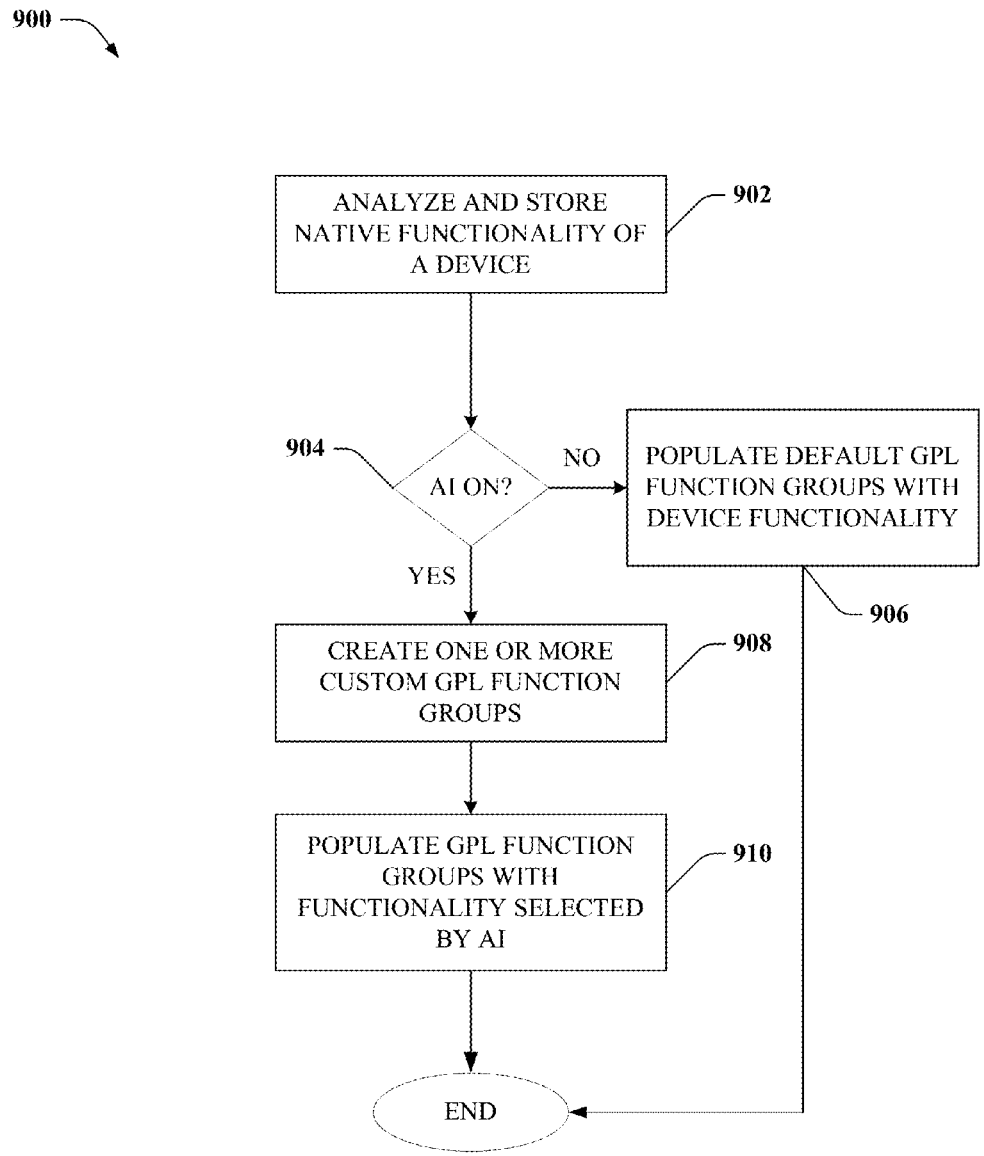
FIG. 9 illustrates a sample methodology for enhancing a user-experience of a particular user by selectively displaying native functionality according to user-specified preferences and information determined about a particular user.

FIG. 9 illustrates a methodology for enhancing a user-experience of a particular device user by selectively displaying native functionality according to user-specified preferences and machine determinable information known about a user, multiple related users, and/or a device. At 902, an artificial intelligence mechanism analyzes and stores native functionality of a device. At 904, a determination is made as to whether a user has activated or de-activated artificial intelligence based UI. If artificial intelligence is de-activated, methodology 900 proceeds to 906 where default GPL function groups are populated with device functionality logically correlated to such function groups, optionally from disparate portions of the native UI, as specified in the subject disclosure. If artificial intelligence is activated, methodology 900 proceeds to 908 where at least one custom GPL function group is created by artificial intelligence. Such function group can be in accord with user defined preferences, usage history, information compiled from a group of networked devices, and situational context of a user as defined supra. At 910, device functionality logically correlated with a function group(s) is populated to the one or more custom GPL function groups, as well as to other function groups (e.g., default function groups displayed at the GPL in conjunction with custom function groups). At 950, the methodology delays a default or user-specified period of time before returning to 920 to repeat the process.

Figure 10:
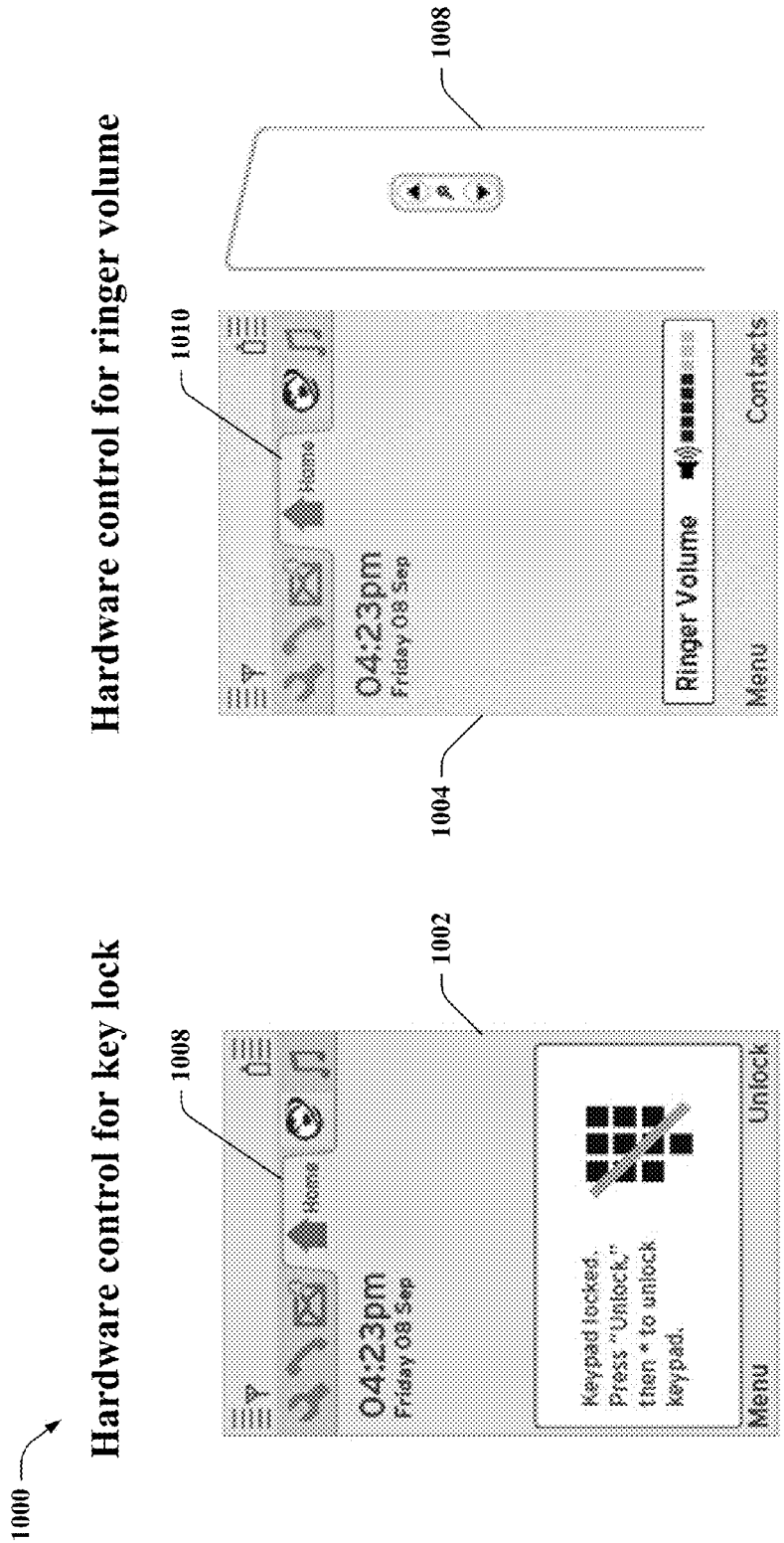
FIG. 10 depicts an example of native functionality exposed through a GPL in a manner consistent with a native operating system.

FIGS. 10 through 13 illustrate examples of a GPL interface that can selectively mask and reveal functionality of a native UI of a device. FIG. 10 depicts user interface indication that provides on-screen feedback for hardware controls of a device that are consistent with a device's native operating system. User interface displays (1002, 1004) of a mobile device with a GPL overlay are depicted that indicate a keypad lock function (1002) and ringer volume function (1004) consistent with functionality associated with a native UI. Function group icons associated with the GPL are shown toward the top of the displays (1002, 1004). Each such function group icon can bundle access to, availability of and/or controls for one or more native UI functions logically related with a name, title, and/or purpose (e.g., a logical application of functionality represented within a particular function group, such as device controls correlated within a Settings and/or Options function group, or Internet access capabilities, shortcuts, or the like correlated within an Internet/Media function group, and the like) of a function group. Additionally, such functionality can be organized within dissimilar portions of the native UI of the device.

Specifically, display 1002 is an example depiction of functionality associated with a display indication of a hardware key lock function of a device. The display indication is correlated with a 'Home' function group 1006 of a GPL, which can bundle access to, availability of, and/or control of general device and/or user information, such as current date, time of day, device status (e.g., status of keypad), or the like. In addition, 'Home' function group 1008 can be displayed as a house (or, e.g., a like icon logically related and/or indicative of a home, base, or default screen, or combinations thereof or of the like, of a device) icon. Selection of the 'Home' page GPL function group can cause a GPL to graphically distinguish such function group from non-selected GPL function groups. As depicted 'Home' page function group 1008 is depicted as part of a distinct folder with the house icon as a marker of the folder. In addition, within the 'Home' function group folder, icons indicating the time of day, the date, the keypad status, and 'menu' and 'unlock' commands are displayed.

Display 1004 is an example depiction of a display indication of hardware ringer volume functionality, depicted at 1008. An example hardware ringer control 1006 can be used to control volume of a device speaker or like equipment related to a ringing function (e.g., to indicate an incoming communication, existence of a message received at a device, for a user, or combinations thereof or of the like). Display indicator 1004 depicts a current volume setting of the hardware ringer control 1006 on a 'Home' function group 1010 of a GPL, in a manner substantially similar to that described above in regard to display indicator 1002. It should be appreciated that GPL functionality indication can be substantially similar to that displayed by a native UI of a device (e.g., for consistency) or can be comprised of customized icons or graphical display entities, different from that utilized by a native UI.

Figure 11:
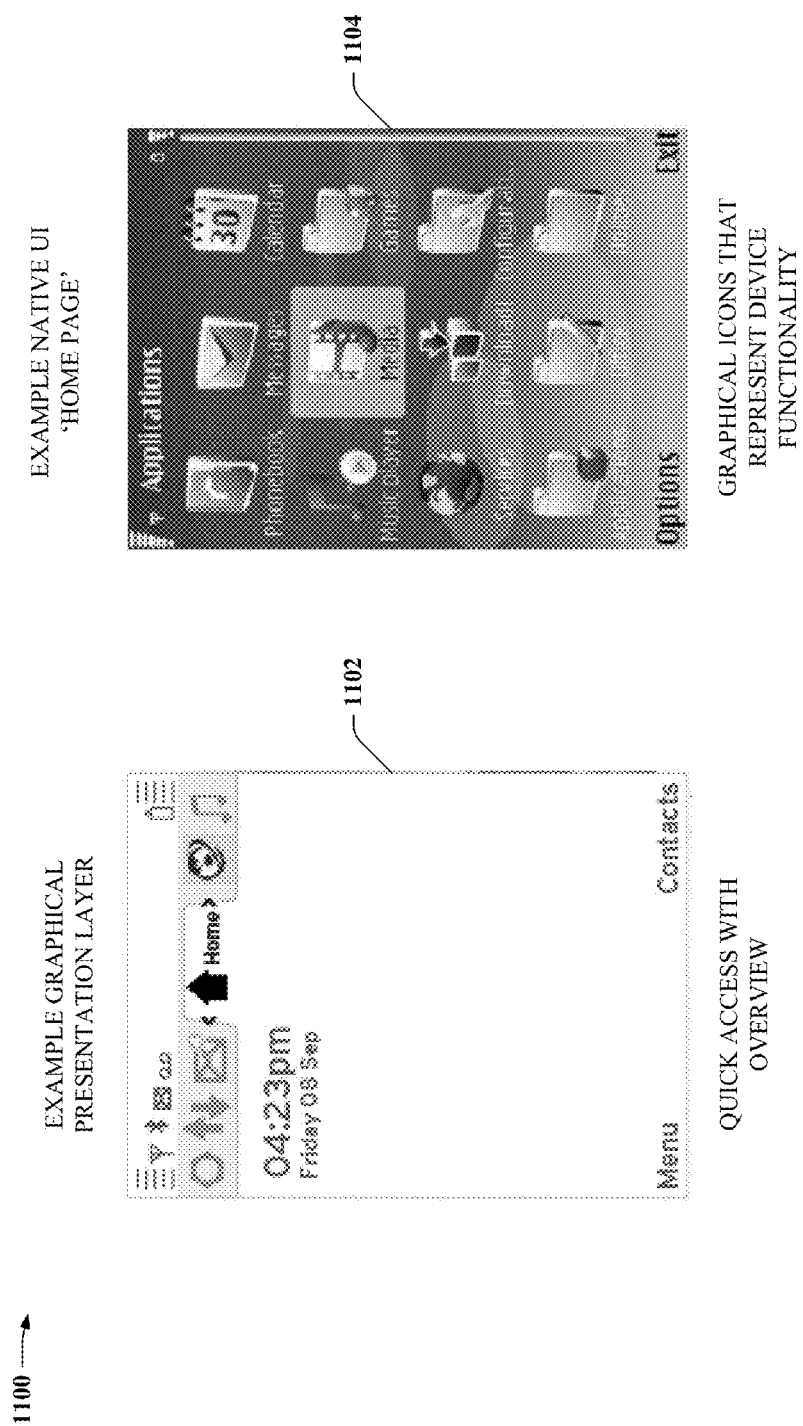
FIG. 11 contrasts a sample GPL interface with a sample native UI to depict aesthetic and functional benefits of the GPL interface.

FIG. 11 contrasts a sample GPL overlay 1102 with a sample native UI 1104. Native UI 1104 displays graphical icons that represent a device's native functionality, and allows a user to access that functionality by selecting an icon and further selecting an options key or otherwise executing that icon. To expose further device functionality beyond that displayed in native UI 1104, a user must traverse to a next logical layer of the native UI 1104. GPL overlay 1102, in contrast with native UI 1104, can be more graphically pleasing and less cluttered. It can provide a user with quick access to native functionality of a device from an aesthetically pleasing visual overview. For example, GPL overlay 1102 can utilize artwork, pictures, or other digital video files as a UI and/or home screen 'wallpaper' (e.g., graphical depiction of a portion or all of a background of a device display).

To access GPL function groups of GPL overlay 1102, a user need merely move a selection indicator across the various GPL function group icons to display GPL function sub-groups or the like or device functionality, or combinations of both associated with a function group. GPL overlay 1102 depicts a display of a home page function group and associated icons, such as date, time and menu and messaging commands, along with UI display 'wallpaper'. Examples of function group icons that can selectively expose native UI functionality logically and/or operationally correlated to the function group depicted at GPL overlay 1102 can include (e.g., from left to right) Settings, Calls, Home page (selected), Internet/Media, and Music, respectively. Traversing a selection device of GPL overlay 1102 over any function group can reveal functionality and/or sub-groups associated with that function group. Such aspect of GPL overlay 1102 can increase efficiency and exposure of functionality not immediately displayed at a device UI. By way of contrast, native UI 1104 indicates an example of a traditional native UI with a media Internet icon having been selected that displays no additional information related to the selected icon.

Figure 12:
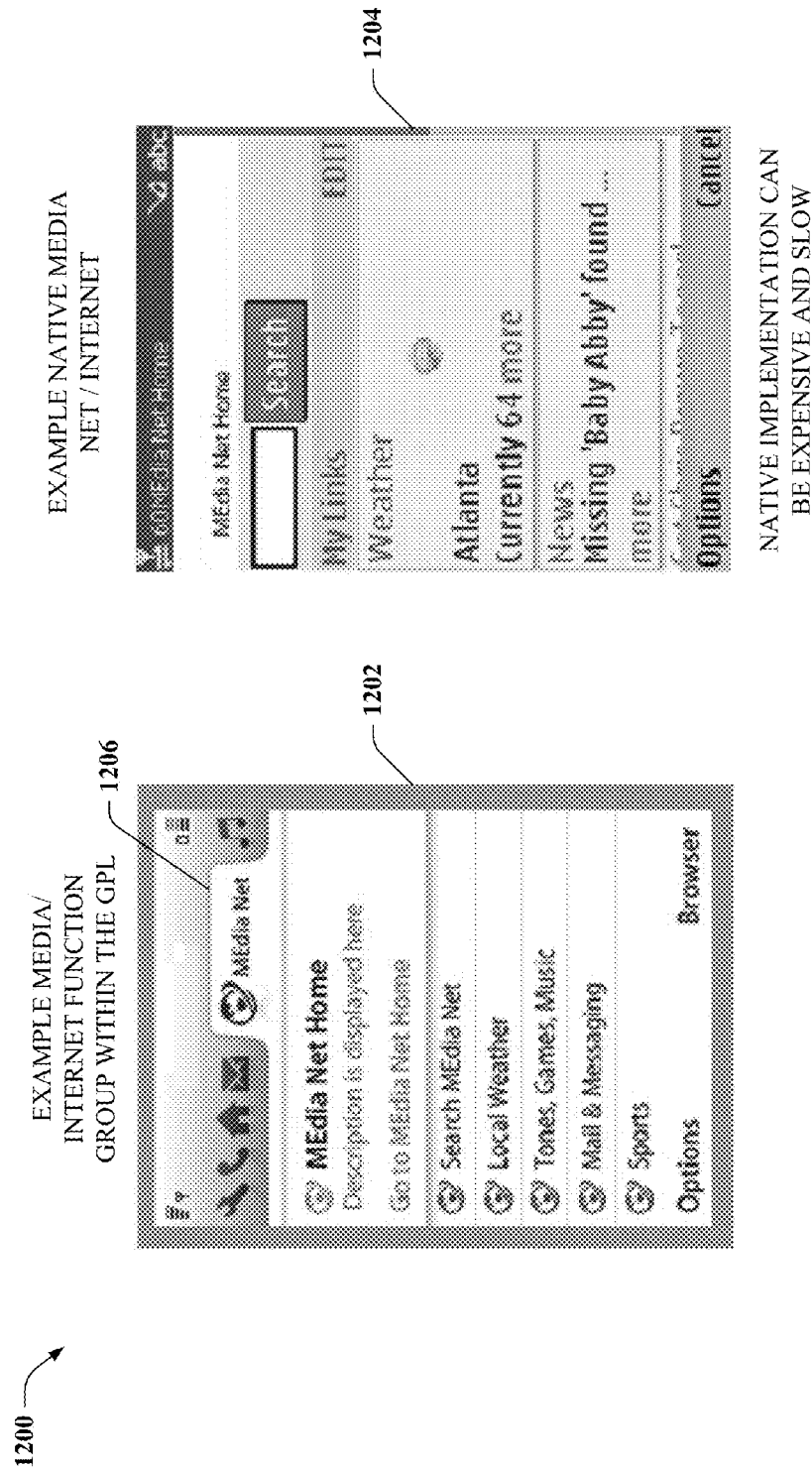
FIG. 12 contrasts a sample GPL function group with a collection of related functions presented within a native UI.

FIG. 12 illustrates a further example native UI 1204 with a GPL overlay 1202 in accord with one or more aspects of the claimed subject matter. Native UI display 1204 depicts a sample Internet/Media page for accessing Internet content via a UI of a mobile device. Various examples of information are displayed at native UI display 1204, including weather, news, a media search function, and additional device commands (e.g., options and page cancel commands). GPL overlay 1202 depicts functionality and/or GPL function sub-groups of a selected GPL function group 'Media Net' 1206. Additionally, the 'Media Net' function group icon is depicted as graphically distinct from non-displayed GPL function groups (represented by display icons, from left to right across the top of display 1202, depicting a wrench, phone, house, envelope, and musical note) wherein the main body of the display is encapsulated by a graphical representation of a file folder (with white background) where the 'Media Net' function group icons 1206 is displayed within the tab of such file folder. GPL overlay 1202 depicts sub-groups (e.g., Media Net Home, Search Media Net, Local Weather, Tones, Games, Music, Mail & Messaging, and Sports) of the 'Media Net' function group (1206), in a manner that can selectively mask and expose functionality of a device logically and/or operationally correlated with Internet and online Media within such function group (1206). Also, GPL overlay 1202 can organize access to, availability of and/or execution of functionality in a logical and user-efficient manner as compared with a native UI (1204) of a device.

Figure 13:
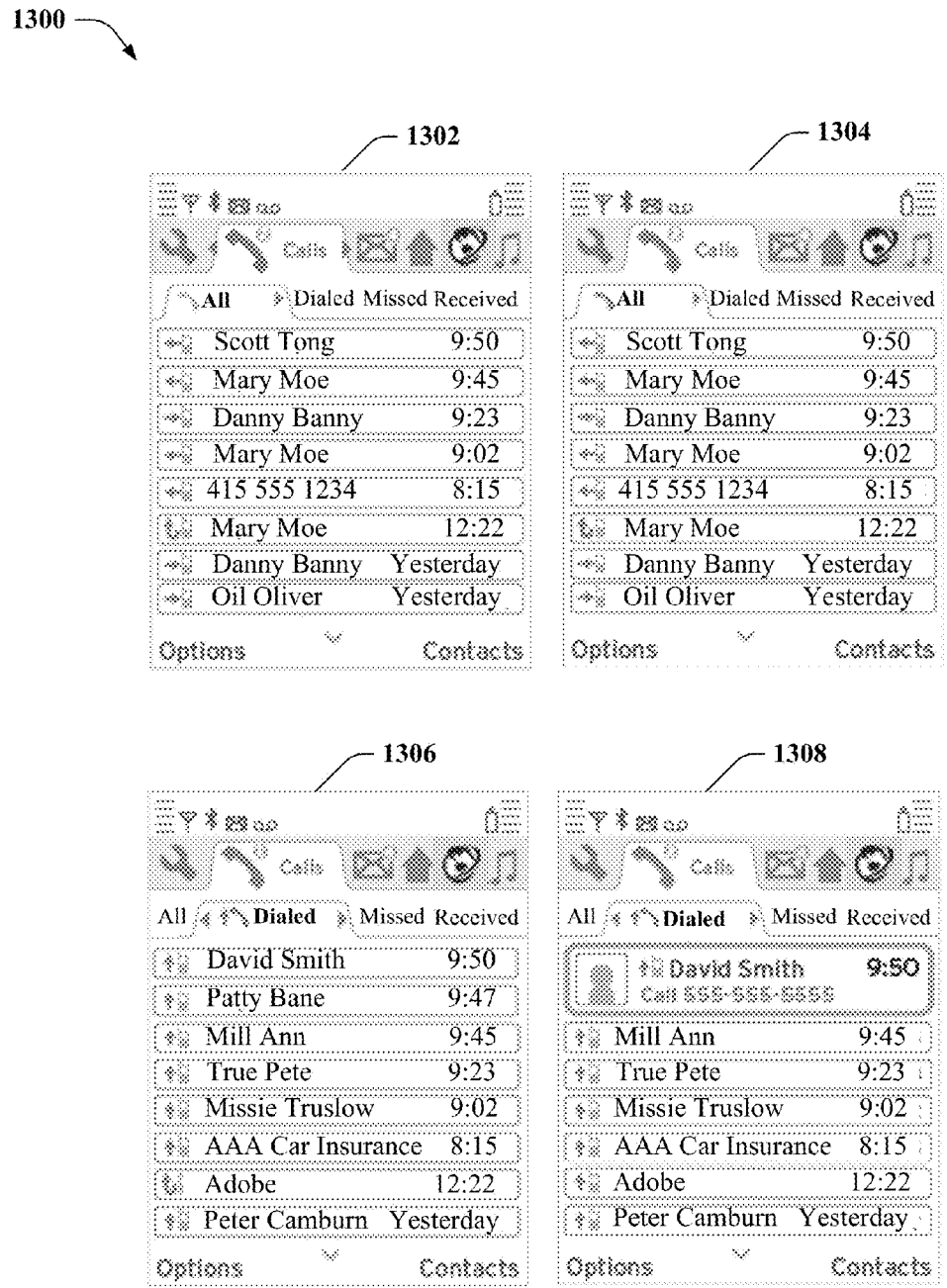
FIG. 13 depicts an example of how graphically distinguishing selected GPL function groups and sub-groups from non-selected groups in accord with aspects of the subject innovation.

FIG. 13 illustrates a further example of how GPL function group sub-groups and GPL function group icons can be graphically distinguished from non-selected sub-groups and icons as a user traverses a GPL interface. At 1302 is an example of a graphical distinction of selected and non-selected items at a GPL function group layer. At 1304 is depicted a graphical distinction of selected and non-selected items at a GPL function sub-group layer. The sub-group 'All' of the Calls function group is highlighted and emboldened at 1304, distinguishing it from non-selected sub-groups 'Dialed', 'Missed' and 'Received'. At 1306 is depicted an example of visual indication of traversing from one selected sub-group to another in accord with aspects of the subject innovation. More specifically, the 'Dialed' sub-group is highlighted and emboldened (also including left and right arrows, highlighted and emboldened, indicating available direction of traversal of a display selector) to indicate a newly selected sub-group. Finally, at 1306 is an example depiction of a graphical distinction of selected and non-selected items at a GPL functionality layer, specifically an indicator of a particular dialed telephone device and a user associated with such device, a time of call. Additionally, functionality for immediate callback of such selected device and/or user can be included within the display indication.

Figure 14:
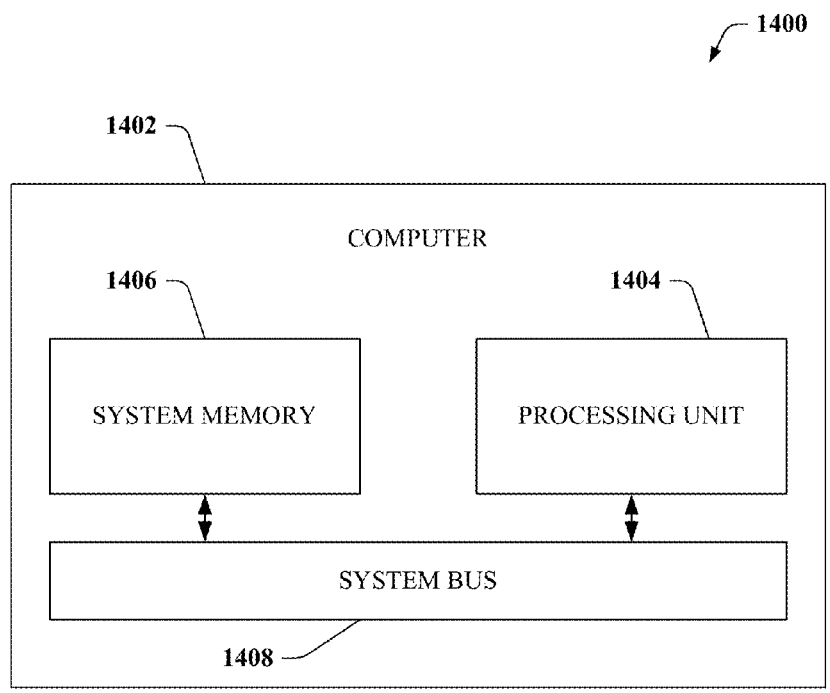
FIG. 14 illustrates an example computing environment that can be employed in connection with various aspects described herein.

Referring now to FIG. 14, there is illustrated a block diagram of a computer operable to provide networking and communication capabilities between a wired or wireless communication network and a server and/or communication device. While shown through use of a computer or computing components, it is understood that the claimed subject matter can be implemented as a method, apparatus, or article of manufacture using standard programming and/or engineering techniques to produce software, firmware, hardware, or combinations thereof to control a computing device, such as a mobile handset, to implement the disclosed subject matter. The term "article of manufacture" as used herein is intended to encompass a computer program accessible from any suitable computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, SIM cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

In order to provide additional context for various aspects of the claimed subject matter, FIG. 14 and the following discussion are intended to provide a brief, general description of a suitable computing environment 1400 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media can include volatile and non-volatile media as well as removable and non-removable media all implemented in accord with any suitable method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 14, the exemplary environment 1400 for implementing various aspects includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors, such a single core processor, a multi-core processor, or any other suitable arrangement of processors. The system bus 1408 can be any of several types of bus structure that can further interconnect to a memory bus (with or without a memory controller), a peripheral bus, and a local bus using any of a variety of commercially available bus architectures. The system memory 1406 can include read-only memory (ROM), random access memory (RAM), high-speed RAM (such as static RAM), EPROM, EEPROM, and/or the like. Additionally or alternatively, the computer 1402 can include a hard disk drive, upon which program instructions, data, and the like can be retained. Moreover, removable data storage can be associated with the computer 1402. Hard disk drives, removable media, etc. can be communicatively coupled to the processing unit 1404 by way of the system bus 1408.

The system memory 1406 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1402 through one or more wired/wireless input devices, such as a keyboard, pointing and clicking mechanism, pressure sensitive screen, microphone, joystick, stylus pen, etc. A monitor or other type of interface can also be connected to the system bus 1408.

The computer 1402 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1402 can connect to other devices/networks by way of antenna, port, network interface adaptor, wireless access point, modem, and/or the like.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
    based on a location determination and a time determination, determining movement information indicative of a movement of a mobile communication device, wherein location data indicative of a geographical location of the mobile communication device is determined to facilitate the location determination, and
    based on determining that the movement information has been modified, rendering, via an interface of the mobile communication device, an updated graphical presentation layer that displays a customized function menu comprising respective graphical objects representing logically related functions of the mobile communication device, wherein the rendering comprises overlaying display data presented via the interface with the updated graphical presentation layer, wherein the respective graphical objects are not displayed together via the display data, wherein a function of the logically related functions is executed in response to determining that a corresponding graphical object of the respective graphical objects has been selected, and wherein a first size of the respective graphical objects displayed via the updated graphical presentation layer is different from a second size of the respective graphical objects displayed via the display data.

2. The system of claim 1, wherein the updated graphical presentation layer displays the respective graphical objects as tiled graphical icons.

3. The system of claim 1, wherein the customized function menu is determined based on interest data associated with the device.

4. The system of claim 1, wherein the customized function menu is determined based on historical data associated with usage of an application of the device.

5. The system of claim 1, wherein the customized function menu is determined based on timing data indicative of a time of day.

6. The system of claim 1, wherein the respective graphical objects are displayed via the updated graphical presentation layer at a first location on a display of the device that is different from a second location on the display where the respective graphical objects are displayed via the display data.

7. The system of claim 1, wherein the customized function menu is determined based on temperature data that represents a temperature associated with the geographical location of the device.

8. The system of claim 1, wherein the customized function menu is determined based on traffic data that represents traffic associated with the geographical location of the device.

9. The system of claim 1, wherein the operations further comprise: based on determining that selection data has been received, switching a display of the device between the display data and the updated graphical presentation layer.

10. A method, comprising:
based on a location determination and a time determination, determining, by a system comprising a processor, movement information indicative of a movement of a mobile communication device, wherein location data indicative of a geographical location of the mobile communication device is determined to facilitate the location determination;
based on determining that the movement information has been modified, rendering, by the system, an updated graphical presentation layer via an interface of the mobile communication device, wherein the rendering comprises overlaying display data presented via the interface with the updated graphical presentation layer that renders a function menu group comprising respective graphical objects representing logically related functions of the mobile communication device,
wherein the respective graphical objects are not displayed together via the display data, and wherein a first size of the respective graphical objects displayed via the updated graphical presentation layer is different from a second size of the respective graphical objects displayed via the display data; and
in response to receiving input data that selects a graphical object of the respective graphical objects that represents a function of the logically related functions, facilitating, by the system, an execution of the function.

11. The method of claim 10, further comprising: determining, by the system, the function menu group based on historical data associated with usage of an application of the mobile communication device.

12. The method of claim 10, further comprising: selecting, by the system, the logically related functions based on a name associated with the function menu group.

13. The method of claim 10, further comprising: determining, by the system, the function menu group based on temperature data associated with the geographical location of the mobile communication device.

14. The method of claim 10, wherein the determining the movement information comprises determining a speed of the mobile communication device.

15. The method of claim 10, wherein the determining the movement information comprises determining a direction of the movement of the mobile communication device.

16. A non-transitory machine-readable storage medium comprising executable instructions that when executed by a processor, facilitate performance of operations, comprising:
based on a location determination and a time determination, determining movement information indicative of a movement of a mobile communication device, wherein location data that is indicative of a geographical location of the mobile communication device is determined to facilitate the location determination; and
based on determining that the movement information has been modified, rendering, via an interface of the mobile communication device, an updated graphical presentation layer that displays a customized function menu comprising respective graphical objects representing logically related functions performed by the mobile communication device,
wherein the rendering comprises overlaying display data presented via the interface with the updated graphical presentation layer, wherein the respective graphical objects are not displayed together via the display data,
wherein a function of the logically related functions is performed in response to determining that a graphical object of the respective graphical objects, which corresponds to the function, has been selected, and
wherein a first size of the respective graphical objects displayed via the updated graphical presentation layer is different from a second size of the respective graphical objects displayed via the display data.

17. The non-transitory machine-readable storage medium of claim 16, wherein the operations further comprise: determining the customized function menu based on interest data associated with the mobile communication device.

18. The non-transitory machine-readable storage medium of claim 16, wherein the operations further comprise: determining the customized function menu based on temporal data.

19. The non-transitory machine-readable storage medium of claim 16, wherein the operations further comprise: determining the customized function menu based on historical data associated with usage of an application of the mobile communication device.

20. The non-transitory machine-readable storage medium of claim 16, wherein the operations further comprise: determining the customized function menu based on temperature data associated with the geographical location of the mobile communication device.

\* \* \* \* \*